(12) United States Patent
Kim

(10) Patent No.: US 10,635,457 B2
(45) Date of Patent: Apr. 28, 2020

(54) INPUT DEVICE AND UI CONFIGURATION AND EXECUTION METHOD THEREOF

(71) Applicant: TYRENN CO., LTD., Daejeon (KR)

(72) Inventor: Sug Whan Kim, Gimpo-si (KR)

(73) Assignee: TYRENN CO., LTD., Daejeon (KR)

(*) Notice: Subject to any disclaimer, the term of this patent is extended or adjusted under 35 U.S.C. 154(b) by 51 days.

(21) Appl. No.: 15/768,116

(22) PCT Filed: Oct. 12, 2016

(86) PCT No.: PCT/KR2016/011387
§ 371 (c)(1),
(2) Date: Apr. 13, 2018

(87) PCT Pub. No.: WO2017/065482
PCT Pub. Date: Apr. 20, 2017

(65) Prior Publication Data
US 2018/0307507 A1    Oct. 25, 2018

(30) Foreign Application Priority Data

Oct. 15, 2015 (KR) .................. 10-2015-0144167

(51) Int. Cl.
*G09G 5/00* (2006.01)
*G06F 9/451* (2018.01)
(Continued)

(52) U.S. Cl.
CPC .............. *G06F 9/451* (2018.02); *G06F 1/163* (2013.01); *G06F 1/1694* (2013.01); *G06F 3/01* (2013.01); *G06F 3/017* (2013.01); *G06F 3/0346* (2013.01)

(58) Field of Classification Search
CPC ......... G06F 9/451; G06F 3/017; G06F 3/0346
See application file for complete search history.

(56) References Cited

U.S. PATENT DOCUMENTS

| | | | |
|---|---|---|---|
| 2011/0202306 A1* | 8/2011 | Eng ........................... | A61F 4/00 702/150 |
| 2012/0157263 A1* | 6/2012 | Sivak ...................... | G06F 3/014 482/4 |

(Continued)

FOREIGN PATENT DOCUMENTS

| | | |
|---|---|---|
| JP | 2005-352739 | 12/2005 |
| JP | 2010-134905 | 6/2010 |

(Continued)

OTHER PUBLICATIONS

WIPO, PCT Search Report & Written Opinion of PCT/KR2016/011387 dated Jan. 17, 2017.

*Primary Examiner* — Nan-Ying Yang
(74) *Attorney, Agent, or Firm* — Lex IP Meister, PLLC

(57) ABSTRACT

An input device according to an exemplary embodiment of the present invention includes: a band including a contracted or extended flexible area; a sensor which detects a change of the flexible area and outputs a signal corresponding to the detected change of the flexible area; and a main body which is connected to the band and determines a cause operation for the change of the flexible area based on the signal output from the sensor, in which the flexible area includes fixed units, and connection units which connect the fixed units and are contracted or extended, and a distance between the fixed units is changed according to the cause operation.

19 Claims, 52 Drawing Sheets

(51) Int. Cl.
*G06F 1/16* (2006.01)
*G06F 3/0346* (2013.01)
*G06F 3/01* (2006.01)

(56) References Cited

U.S. PATENT DOCUMENTS

2015/0370327 A1* 12/2015 Jiang ................ G06F 3/015
  345/156
2016/0299570 A1* 10/2016 Davydov ............... G06F 1/163

FOREIGN PATENT DOCUMENTS

| KR | 10-2010-0072377 | 6/2010 |
| KR | 10-2011-0022520 | 3/2011 |
| KR | 10-2014-0013845 | 2/2014 |
| KR | 10-2015-0001990 | 1/2015 |
| KR | 10-1499348 | 3/2015 |

* cited by examiner

FIG. 15
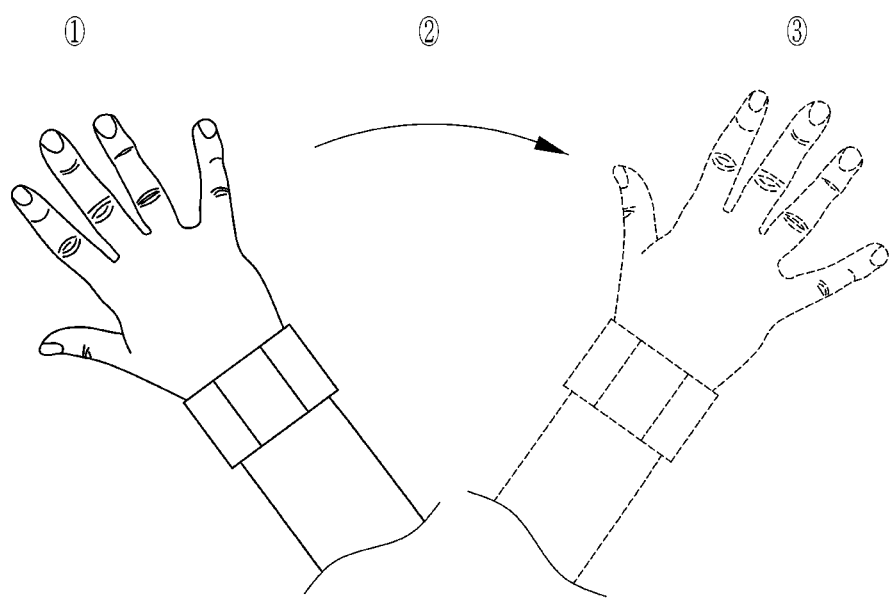
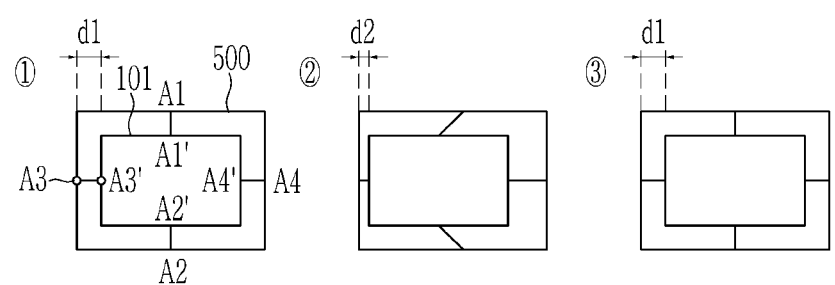

FIG. 37
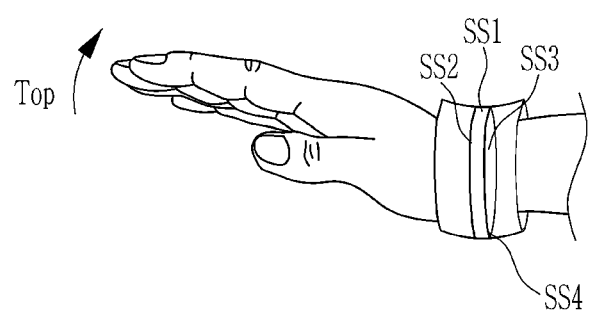
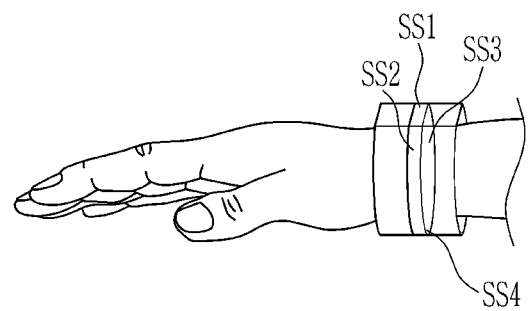
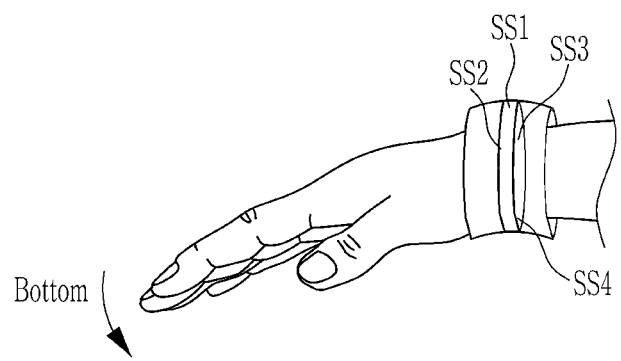

FIG. 40
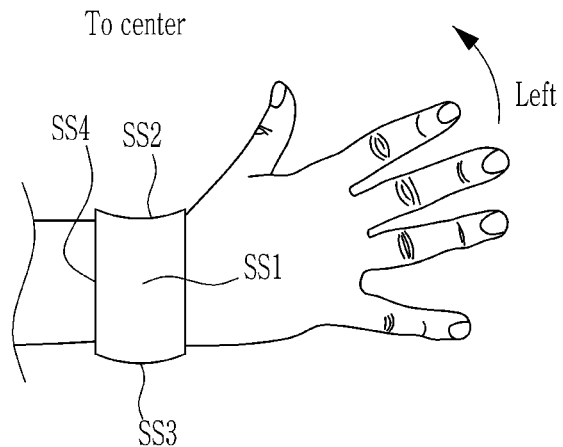
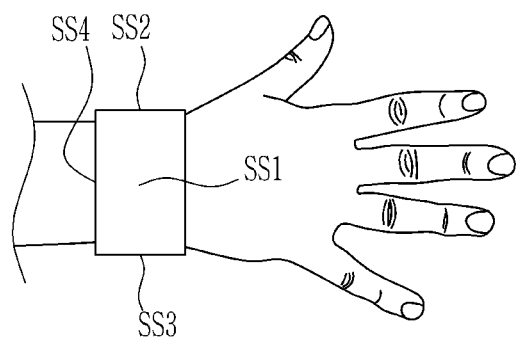
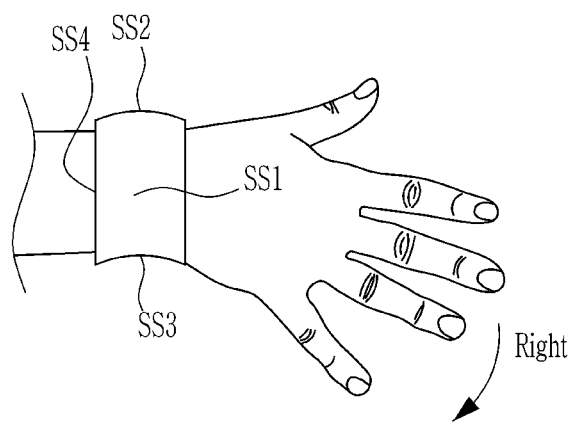

FIG. 46
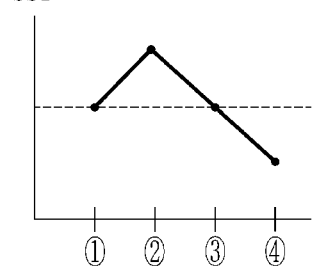
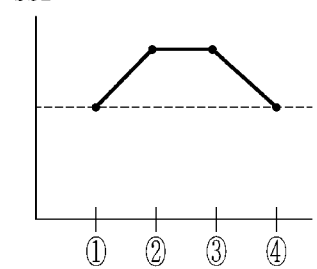
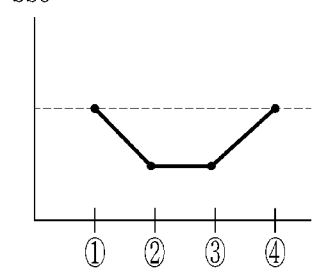
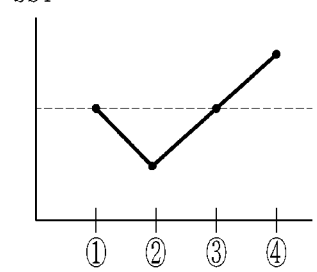

FIG. 47
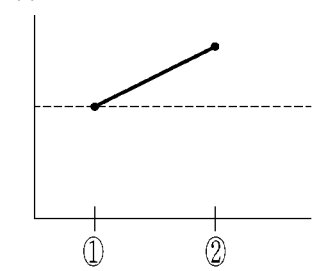
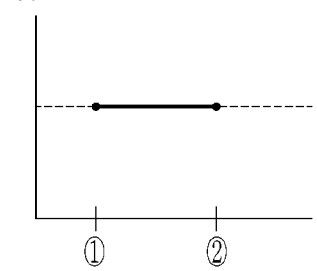
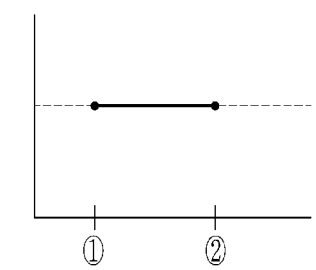
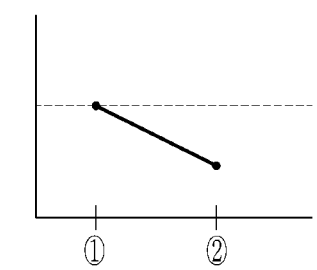

INPUT DEVICE AND UI CONFIGURATION AND EXECUTION METHOD THEREOF

TECHNICAL FIELD

The present invention relates to an input device, and a method of setting and executing a user interface (UI) thereof, and more particularly, to an input device, which is worn on a part of a body or an object and detects and determines a cause operation including a shape change or a movement of a wearing portion on which the input device is worn, external force applied to the input device, or a motion of rubbing the input device, and a method of setting and executing a UI of an input device, which uses the cause operation including the detected and determined shape change or movement of the wearing portion, applied external force, or motion of rubbing the input device.

BACKGROUND ART

Recently, there is growing interest in mobile devices, such as a wearable device worn on a part of a body and a gripped and used smart phone, and as a representative example of the mobile device, product development for a smart watch is actively proceeding. The smart watch is generally worn on a part, that is, a wrist, of a body of a user and includes a display to provide the user with various information. Since the display of the smart watch has a small display area among the mobile devices including a smart phone, it is not easy for a user to input various input signals by using a keyboard, thereby degrading usability and utility of the smart watch.

Further, recently, there is an increase in a wearable device which does not include a display and is worn on a part of a body of a user, and transmits a detected bio-signal of the user or a signal for a movement of the user to a mobile device, such as a smart phone. The wearable device detects a movement of a body by using an image sensor, an accelerator sensor, a gyro sensor, and the like, but when the foregoing sensors are used, complexity and volume of the wearable device are increased and manufacturing cost of the wearable device is increased. Particularly, it is difficult to precisely detect and determine an elaborate shape change and movement of a wearing portion, applied force, or a rubbing motion.

In relation to a wearable device which does not include a display, Korean Patent Application Laid-Open No. 10-2010-0072377 discloses an input device including an adaptive material to be disposed on a skin of a user, but a component, such as a substrate and a cover, configuring an entire shape is required in the sense that an elastic conductor for addressing and a plurality of sensor arrays for detecting a gesture of a user need to be used, so that complexity of the wearable device is increased and cost of the wearable device is also increased.

Further, a movement of a wearing portion is different for each user of the wearable device, so that in an existing wearable device and the related published technologies, it may be difficult for different users to provide the wearable device with the same input signal by using movements of the wearing portions. Further, different signals provided by different users are set and linked by the same user interface (UI) and display function, so that it may be difficult for a plurality of users to use the functions by the same method.

DISCLOSURE

Technical Problem

The present invention has been made in an effort to provide an input device, which precisely detects and determines a shape change, a movement, applied external force, rubbing, or the like in a wearing portion of a user including a person, an animal, a machine, and the like with low manufacturing cost.

The present invention has also been made in an effort to provide an input device, which is capable of designating a signal indicating a detected and determined shape change, movement, applied external force, rubbing, or the like in a wearing portion by a corresponding user interface (UI), and simply operating and executing the UI.

The exemplary embodiment of the present invention may be used for achieving other application objects and similar objects that are not particularly mentioned, in addition to the foregoing object.

Technical Solution

An exemplary embodiment of the present invention provides an input device, including: a band having a contracted or extended flexible area; a sensor which detects a change of the flexible area and outputs a signal corresponding to the detected change of the flexible area; and a main body which is connected to the band, and determines a cause operation for the change of the flexible area based on the signal output from the sensor, in which the flexible area includes fixed units, and connection units which connect the fixed units and are contracted or extended, and a distance between the fixed units is changed according to the cause operation.

Another exemplary embodiment of the present invention provides an input device, including: a band having a contracted or extended flexible area; a sensor which detects a change of the flexible area and outputs a signal corresponding to the detected change of the flexible area; and a main body which is connected to the band, and determines a cause operation for the change of the flexible area based on the signal output from the sensor, in which the flexible area includes transformation units, and connection units which connect the transformation units, and a shape of the transformation unit is changed according to the cause operation.

A shape of the connection unit may be changed according to the cause operation.

Another exemplary embodiment of the present invention provides an input device, including: a band having a contracted or extended flexible area; a sensor which detects a change of a flexible area and outputs a signal corresponding to the detected change of the flexible area; and a main body which is connected to the band, and determines a cause operation for the change of the flexible area based on the signal output from the sensor, in which the flexible area includes fixed units, and transformation units which connect the fixed units, and a distance between the fixed units or a shape of the transformation unit is changed according to the cause operation.

The cause operation may be a shape change of a wearing portion on which the band is worn or a movement of the wearing portion.

The cause operation may be external force applied to the flexible area or an operation of rubbing the flexible area.

The sensor may detect the cause operation based on a change in a distance between the fixed units.

The transformation unit may include a first constituent element and a second constituent element, and the sensor may detect the cause operation based on a change in a distance between the first constituent element and the second constituent element according to shape changes of the first constituent element and the second constituent element.

The sensor may detect the cause operation based on a change in a length of the transformation unit according to a shape change of the transformation unit.

The sensor may be positioned in the flexible area.

The band may further have a fixed area maintaining a form of the band, and the sensor may be positioned between the flexible area and the fixed area.

At least one sensor may be positioned in the band.

Another exemplary embodiment of the present invention provides an input device, including: a main body; a sensor housing provided in the main body; and a sensor which detects a change in a distance between the sensor housing and a fixed unit positioned inside the sensor housing, and outputs a signal corresponding to the detected change in the distance between the sensor housing and the fixed unit, in which the main body determines a cause operation for the change in the distance between the sensor housing and the fixed unit based on the signal output from the sensor.

The input device may further include a band which is connected to the main body and is worn on a partial region of a user.

The cause operation may be a shape change of a wearing portion on which the main body is worn or a movement of the wearing portion.

The cause operation may be external force applied to the main body or an operation of rubbing the main body.

The main body may include a connection unit which connects the sensor housing and the fixed unit and is contracted or extended.

The main body may further include a transformation unit which connects the sensor housing and the fixed unit, and a shape of the transformation unit may be changed according to the cause operation.

The transformation unit may include a first constituent element and a second constituent element, and the sensor may detect the cause operation based on a change in a distance between the first constituent element and the second constituent element according to shape changes of the first constituent element and the second constituent element.

The sensor may detect the cause operation based on a change in a length of the transformation unit according to a shape change of the transformation unit.

Another exemplary embodiment of the the present invention provides an input device, including: a band; a main body connected to the band; and a sensor which detects a change in a distance of a gap formed between the band and the main body, and outputs a signal corresponding to the detected change in the distance of the gap, in which the main body determines a cause operation for the change in the distance of the gap based on the signal output from the sensor.

The cause operation may be a shape change of a wearing portion on which the band is worn or a movement of the wearing portion.

The cause operation may be external force applied to the band or the main body or an operation of rubbing the band or the main body.

The input device may further include a transformation unit which connects the band and the main body, and a shape of the transformation unit may be changed according to the cause operation.

The transformation unit may include a first constituent element and a second constituent element, and the sensor may detect the cause operation based on a change in a distance between the first constituent element and the second constituent element according to shape changes of the first constituent element and the second constituent element.

The sensor may detect the cause operation based on a change in a length of the transformation unit according to a shape change of the transformation unit.

The band may have a ring shape of which one end and the other end are connected to each other.

The band may have a patch shape of which one end and the other end are separated from each other.

The input device may further include a wearing part through which the band is worn on the partial region of the user.

The sensor may measure a change in capacitance and detect the cause operation.

The sensor may measure a change in resistance and detects the cause operation.

The sensor may measure a change in inductance and detect the cause operation.

The sensor may measure a change in a voltage and detect the cause operation.

The main body may further include a communication unit which communicates with an external device.

The main body may further include a movement determining unit which determines the cause operation by using the signal detected by the sensor.

The main body may further include a first memory which stores a signal table including size information about a signal according to a time change and data for the cause operation corresponding to the size information about the signal, and the movement determining unit may compare the detected signal and the size information about the signal according to the time change of the signal table and determine the corresponding cause operation.

The main body may further include: a UI setting unit which sets a UI corresponding to the cause operation; and a second memory which stores the UI set by the UI setting unit and data for the cause operation corresponding to the UI.

The main body may further include a UI executing unit which executes a UI corresponding to the cause operation.

The UI executing unit may extract a UI corresponding to the cause operation from the data stored in the second memory and execute the extracted UI.

The main body may further include: a character setting unit which sets a character corresponding to the cause operation; and a second memory which stores the character set by the character setting unit and data for the cause operation corresponding to the character.

The main body may further include a character generating unit which generates a character corresponding to the cause operation.

The character generating unit may extract a character corresponding to the cause operation from the data stored in the second memory and generates the character.

The main body may further include a sensor signal receiving unit which receives the signal detected by the sensor by wire.

Another exemplary embodiment of the present invention provides a method of setting a user interface (UI) of an input device, the method including: by an input device including a main body, receiving a signal for setting a UI corresponding to a cause operation for a change in a distance between components configuring the input device; detecting the change in the distance between the components configuring the input device and outputting a signal corresponding to the detected change; determining the cause operation by using the output signal; setting a UI corresponding to the cause operation; and storing data for the cause operation and the UI.

Another exemplary embodiment of the present invention provides a method of setting a user interface (UI) of an input device, the method including: by an input device including a main body, receiving a signal for setting a character corresponding to a cause operation for a change in a distance between components configuring the input device; detecting the change in the distance between the components configuring the input device and outputting a signal corresponding to the detected change; determining the cause operation by using the output signal; setting a character corresponding to the cause operation; and storing a measurement signal for the cause operation and data for the character.

The input device may further include a band which is connected to the main body and is worn on a partial region of a user, and the change in the distance between the components configuring the input device may be a change in a distance of a contracted or extended area of the band.

The change in the distance between the components configuring the input device may be a change in a distance between a sensor housing provided in the main body and a fixed unit positioned inside the sensor housing.

The input device may further include a band which is connected to the main body and is worn on a partial region of a user, and the change in the distance between the components configuring the input device may be a change in a distance of a gap formed between the band and the main body.

Another exemplary embodiment of the present invention provides a method of setting a user interface (UI) of an input device, the method including: by an input device including a main body, receiving a signal for setting a UI corresponding to a cause operation for a shape change of a component configuring the input device; detecting the shape change of the component configuring the input device and outputting a signal corresponding to the detected change; determining the cause operation by using the output signal; setting a UI corresponding to the cause operation; and storing data for the cause operation and the UI.

Another exemplary embodiment of the present invention provides a method of executing a user interface (UI) of an input device, the method including: by an input device including a main body, receiving a signal for setting a character corresponding to a cause operation for a shape change of a component configuring the input device; detecting the shape change of the component configuring the input device and outputting a signal corresponding to the detected change; determining the cause operation by using the output signal; setting a character corresponding to the cause operation; and storing a measurement signal for the cause operation and data for the character.

The input device may further include a band which is connected to the main body and is worn on a partial region of a user, and the shape change of the component configuring the input device may be a shape change of a component included in a contracted or extended area of the band.

The shape change of the component configuring the input device may be a shape change of a component positioned inside a sensor housing provided in the main body.

The input device may further include a band which is connected to the main body and is worn on a partial region of a user, and the shape change of the component configuring the input device may be a shape change of a component positioned between the band and the main body.

Another exemplary embodiment of the present invention provides a method of executing a user interface (UI) of an input device, the method including: by an input device including a main body, detecting a cause operation for a change in a distance between components configuring the input device; determining the cause operation by using the detected signal; and extracting and executing a UI corresponding to the cause operation.

Another exemplary embodiment of the present invention provides a method of executing a user interface (UI) of an input device, the method including: by an input device including a main body, detecting a cause operation for a change in a distance between components configuring the input device; determining the cause operation by using the detected signal; and extracting and generating a character corresponding to the cause operation.

The input device may further include a band which is connected to the main body and is worn on a partial region of a user, and the change in the distance between the components configuring the input device may be a change in a distance of a contracted or extended area of the band.

The change in the distance between the components configuring the input device may be a change in a distance between a sensor housing provided in the main body and a fixed unit positioned inside the sensor housing.

The input device may further include a band which is connected to the main body and is worn on a partial region of a user, and the change in the distance between the components configuring the input device may be a change in a distance of a gap formed between the band and the main body.

Another exemplary embodiment of the present invention provides a method of executing a user interface (UI) of an input device, the method including: by an input device including a main body, detecting a cause operation for a shape change of a component configuring the input device; determining the cause operation by using the detected signal; and extracting and executing a UI corresponding to the cause operation.

Another exemplary embodiment of the present invention provides a method of executing a user interface (UI) of an input device, the method including: by an input device including a main body, detecting a cause operation for a shape change of a component configuring the input device; determining the cause operation by using the detected signal; and extracting and generating a character corresponding to the cause operation.

The input device may further include a band which is connected to the main body and is worn on a partial region of a user, and the shape change of the component configuring the input device may be a shape change of a component included in a contracted or extended area of the band.

The shape change of the component configuring the input device may be a shape change of a component positioned inside a sensor housing provided in the main body.

The input device may further include a band which is connected to the main body and is worn on a partial region of a user, and the shape change of the component configuring the input device may be a shape change of a component positioned between the band and the main body.

Advantageous Effects

According to the exemplary embodiment of the present invention, it is possible to provide the input device, which precisely detects and determines a shape change, a movement, applied external force, rubbing, or the like in a wearing portion of a user including a person, an animal, a machine, and the like with low manufacturing cost.

Further, according to the exemplary embodiment of the present invention, it is possible to provide an input device, which is capable of designating a signal indicating a detected and determined shape change, movement, applied external force, rubbing, or the like in a wearing portion by a corresponding user interface (UI), and simply operating and executing the UI.

DESCRIPTION OF THE DRAWINGS

FIG. 15 is a diagram illustrating a change in a gap between a sensor housing and a fixed unit by the law of inertia in a movement in which a user moves a right hand from a left side to a right side and stops in the input device according to the third exemplary embodiment of the present invention.

FIG. 37 is a diagram illustrating an example in which a user wears the input device according to the exemplary embodiment of the present invention and bends a joint of a wrist in upper and lower directions.

FIG. 40 is a diagram illustrating an example in which a user wears the input device according to the exemplary embodiment of the present invention and moves a wrist in left and right directions.

FIGS. 46 and 47 are graphs illustrating signals obtained by detecting a movement of a wrist of FIG. 45.

MODE FOR INVENTION

Figure 1:
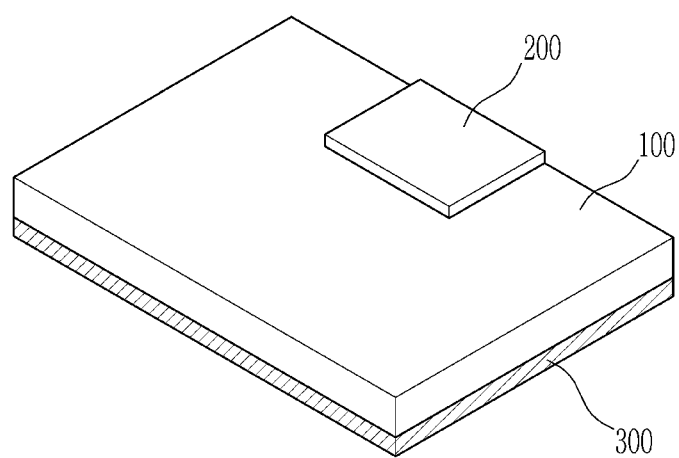
FIG. 1 is a perspective view illustrating an input device according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification. Further, a detailed description of a widely known published technology will be omitted.

Throughout the specification, a term "user" may be defined with "all of the objects having bodies on which the input device of the present invention is worn, that is, connected or attached, and which generate a cause operation defined below or receive the generated cause operation and effect". Accordingly, in the present specification, the present invention is described based on a person, an animal, and a mechanical device as a main example, but is not essentially limited thereto, and an artificial object or a natural object having a predetermined form, that is, things, may also be included to the "user" of the present invention.

In addition, unless explicitly described to the contrary, the word "comprise" and variations such as "comprises" or "comprising" will be understood to imply the inclusion of stated elements but not the exclusion of any other elements. In addition, the term "-unit" described in the specification means a unit for processing at least one function and operation and can be implemented by hardware components or software components and combinations thereof.

Throughout the specification, when it is described that a part is "connected" to another part, the part may be "directly connected" to another element or "connected" to another part through an intervening third part.

Further, throughout the specification, it shall be appreciated that a "joint" is "a part of a user including a person, an animal, and a machine, and is an entirety of each of all of the regions which is bent, is changeable in form, and is movable, and on which an input device of the present invention may be worn". Particularly, when a user is a person, various body joint regions, such as a wrist joint, a wrist joint, a knee wrist, an angle wrist, are representative examples of a wearing portion of a user.

Further, throughout the present specification, it is considered that "wearing" includes "all of the states in which at least a part of the input device of the present invention maintains a surface-contact state with a part of a user including a person, an animal, a machine, and an object, or is connected with and is not completely from a part of a user". For example, the "wearing" includes the case where by a method of wearing winding, attaching, or gripping, by a user, the input device on a body in a direct manner or via another object connected with the input device, a contact of a surface of a part of the input device of the present invention and a part of a body of the user is maintained or a user and the input device of the present invention are not completely separated and maintains a connection state.

Accordingly, the range of the "wearing" also includes a state where the input device of the present invention is attached to a part of a user by a material, such as an adhesive, or the input device is combined with clothes or wearing accessories and is connected to a user.

Throughout the specification, a term "band" is defined to have a "ring shape" of which one end is connected with the other end, or a "patch shape" of which one end is separated from the other end.

Throughout the specification, a term "shape" or "form" means a "shape defined by a variable, such as a length, a width, a height, an area, a volume, and the like", and thus, a "shape change" is defined that the quantity of at least one of the variables defining a shape, such as the length and the height, is changed. Accordingly, throughout the specification, extension, contraction, bending, and curving of a constituent element of the input device of the present invention are included in the "shape change".

Throughout the specification, a term "movement" means that "a part or an entirety of the input device moves from one position of a space to another position", and thus, includes the case where the entire input device is accelerated or decelerated.

Throughout the specification, a term "component" means unit constituent elements which are connected to or combined with one another and configure the input device of the present invention, and constituent elements including the unit constituent elements, and representative examples thereof include a connection unit, a fixed unit, a transformation unit, a band, a main body, a sensor housing, and the like which are to be described below.

Throughout the specification, a term "cause operation" means an operation including a shape change of a wearing portion or a movement of a wearing portion of a user for operating an input device according to the exemplary embodiment of the present invention, external force applied to the input device of the present invention, an operation of rubbing the input device of the present invention, and the like.

Further, throughout the present specification, first, second, third, and fourth exemplary embodiments of an input device are described, and first and second exemplary embodiments for a main body applicable to each exemplary embodiment of the input device are described.

Figure 2:
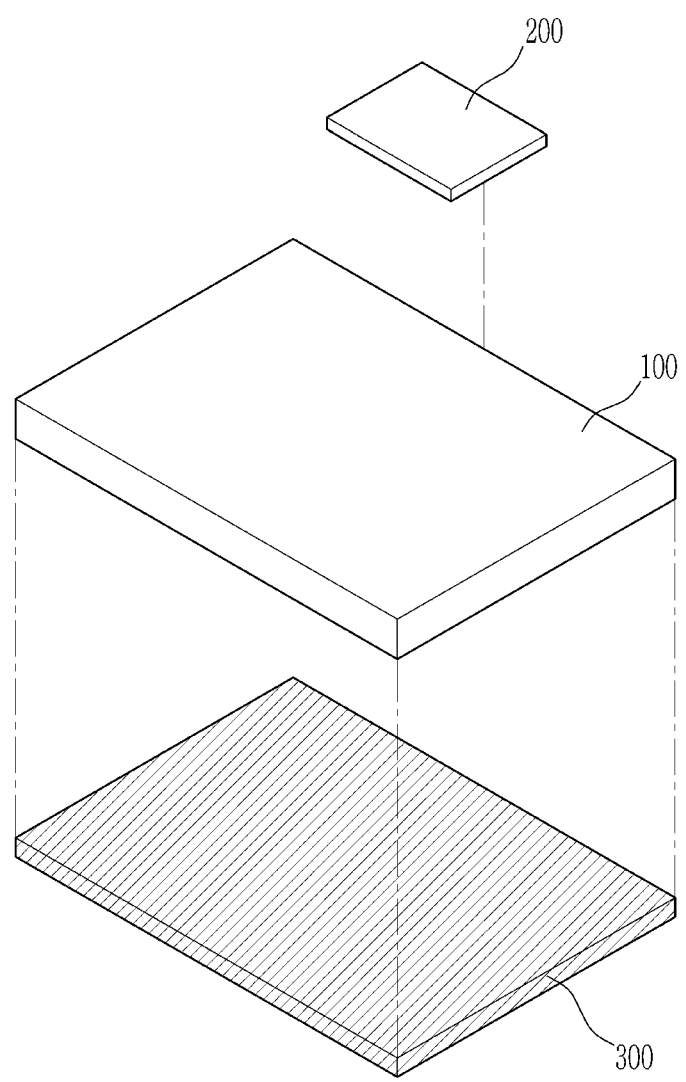
FIG. 2 is an exploded perspective view illustrating the input device according to the exemplary embodiment of the present invention.
Figure 3:
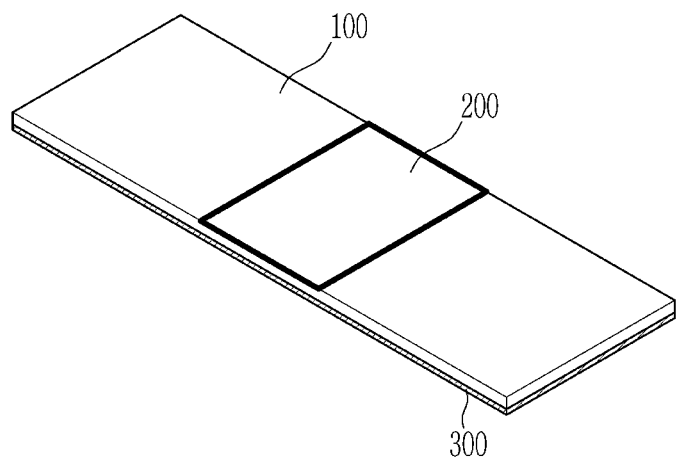
FIGS. 3 and 4 are diagrams illustrating an example of a shape of the input device according to the exemplary embodiment of the present invention.
Figure 4:
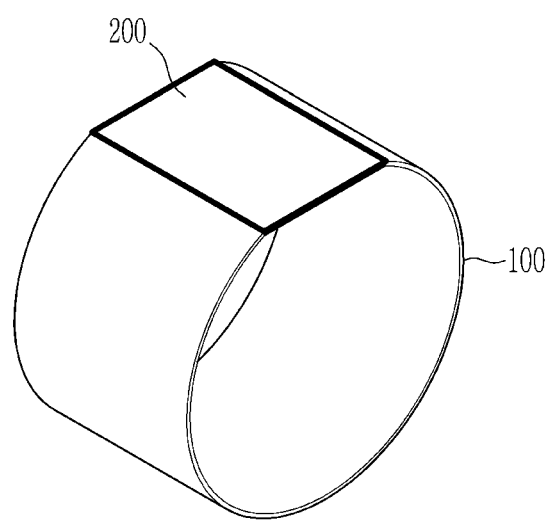
Figure 5:
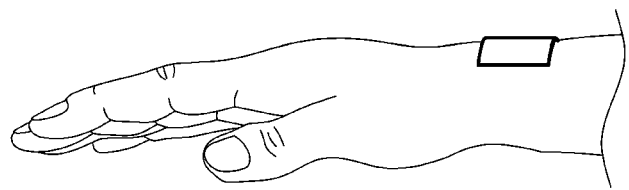
FIGS. 5 and 6 are diagrams illustrating an example of the state where the input device according to the exemplary embodiment of the present invention is worn on a wrist of a user.
Figure 6:
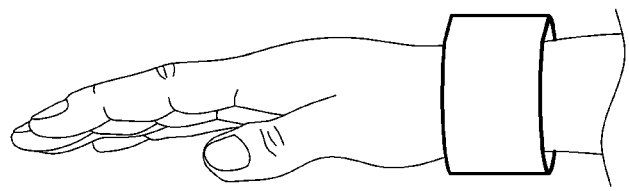

FIG. 1 is a perspective view illustrating an input device according to an exemplary embodiment of the present invention, and FIG. 2 is an exploded perspective view illustrating the input device according to the exemplary embodiment of the present invention. FIGS. 3 and 4 are diagrams illustrating an example of a shape of the input device according to the exemplary embodiment of the present invention. FIGS. 5 and 6 are diagrams illustrating an example of the state where the input device according to the exemplary embodiment of the present invention is worn on a wrist of a user.

The input device according to the exemplary embodiment of the present invention includes a band 100, which is worn on a partial region of a user, for example, surrounding or attached to a joint, a main body 200 which is connected to the band 100 and communicates with an external device, and determines a signal input to the input device according to the exemplary embodiment of the present invention, and a wearing part 300 through which the band 100 is worn on the partial region of the user.

The main body 200 may be directly connected to the band 100, but may be connected with the band 100 with a housing (not illustrated) surrounding the main body 200 interposed therebetween.

A processor for determining a signal input to the input device, and a relevant electric and electronic circuit and the like may be embedded in the main body 200. In the input device of FIG. 1, the main body 200 is positioned in the form of being connected with the band 100 at an external side of the band 100, but the position of the main body 200 of the present invention is not limited thereto, and the main body 200 may be positioned in the form of being inserted into the band 100 and connected with the band 100, and may be positioned in the form of being connected with a predetermined region, such as a center and a boundary, of the band 100.

The wearing part 300 is connected with a part of the band 100 and makes the input device according to the exemplary embodiment of the present invention be worn on a partial region of a user. The wearing part 300 may be formed of all of the materials which are capable of attaching or combining the band 100 to a wearing portion, and for example, the wearing part 300 may be formed of a material, such as an adhesive.

When the band 100 has a ring shape, the wearing part 300 may not be included in the input device according to the exemplary embodiment of the present invention. That is, when the input device according to the exemplary embodiment of the present invention has a form which may be worn on a partial region of a user even though including no wearing part 300, the wearing part 300 may be omitted. For example, when the band 100 has a patch shape as illustrated in FIG. 3, the wearing part 300 may be included, and when the band 100 has a ring shape as illustrated in FIG. 4, the wearing part 300 may be omitted.

When the input device according to the exemplary embodiment of the present invention in which the band 100 has the patch shape is worn on a wrist of a user, the input device may be attached to and worn on an upper portion of the wrist as illustrated in FIG. 5 and may be attached and worn in the form of surrounding the wrist as illustrated in FIG. 6. Even when the input device includes the band 100 having the patch shape, the input device may be worn on a partial region of a user in the same form as that of the input device including the band 100 having the ring shape.

The input device according to the exemplary embodiment of the present invention may be manipulated based on a shape change or a movement of a portion on which the input device is worn, and may be manipulated by touching or rubbing the input device by a user. Further, the input device may also be operated by holding a part of the input device and applying external force for pressing or pulling the input device.

For example, a user may manipulate the input device by wearing the input device on a wrist and bending or moving the wrist, and may manipulate the input device by touching the input device by using a hand. Further, the user may manipulate the input device by moving an entire arm including a wrist, by pulling or pressing the band 100 by using the other hand, by holding and moving the main body 200 by using the other hand, by holding and pressing the main body 200 and applying external force to the main body 200 or pressing and rubbing the main body 200 by using a finger of the other hand.

As a representative example, in the state where the input device is worn on a joint region of a user, the input device according to the exemplary embodiment of the present invention may detect and determine a cause operation including a shape change or a movement of the joint of the user, applied external force, or rubbing, and set and execute a user interface (UI) corresponding to the cause operation including the shape change or the movement of the joint, the applied external force, or the rubbing.

When a user using the input device according to the exemplary embodiment of the present invention is a person, the user may manipulate the input device with a different cause operation, so that the input device may provide a UI operated in accordance with the different cause operation as defined by the user.

The input device according to the exemplary embodiment of the present invention may provide a UI executed according to the cause operation. For example, the user may execute a predetermined specific UI of the input device by moving or bending a joint region of a wrist of a user.

Hereinafter, a method of detecting a cause operation, such as a shape change or a movement of a wearing portion of a user will be described in detail by using an example in which an input device according to a first exemplary embodiment of the present invention is worn on a wrist of a user with reference to FIGS. 7 to 12.

Figure 7:
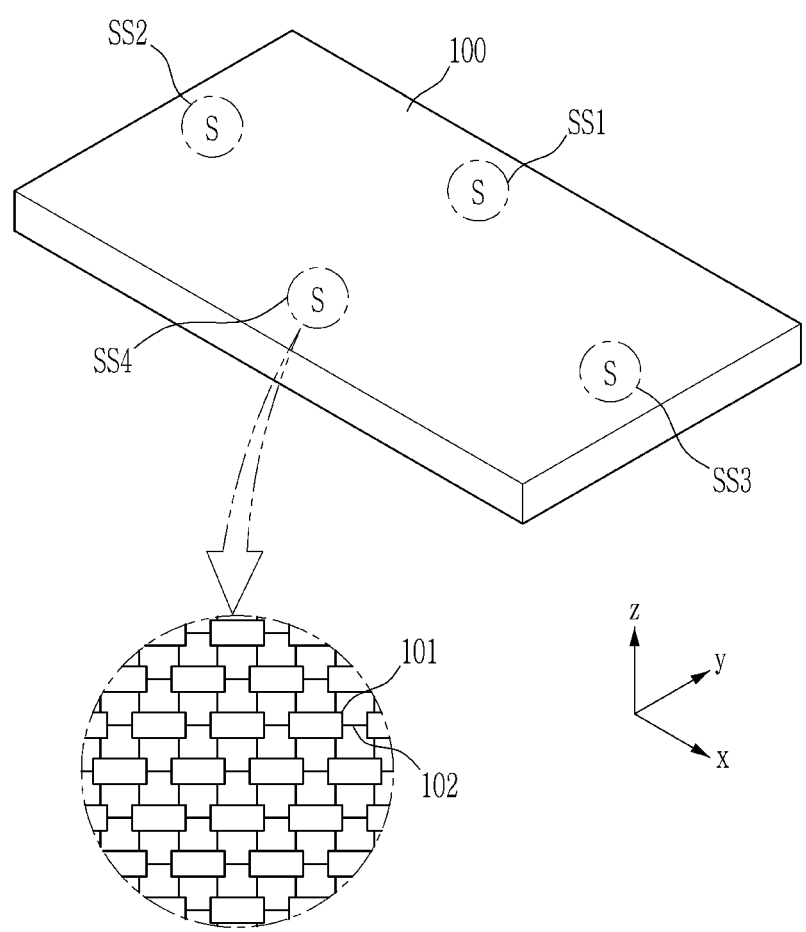
FIG. 7 is an enlarged diagram of a part of a band in which sensors of an input device according to a first exemplary embodiment of the present invention are positioned.
Figure 8:
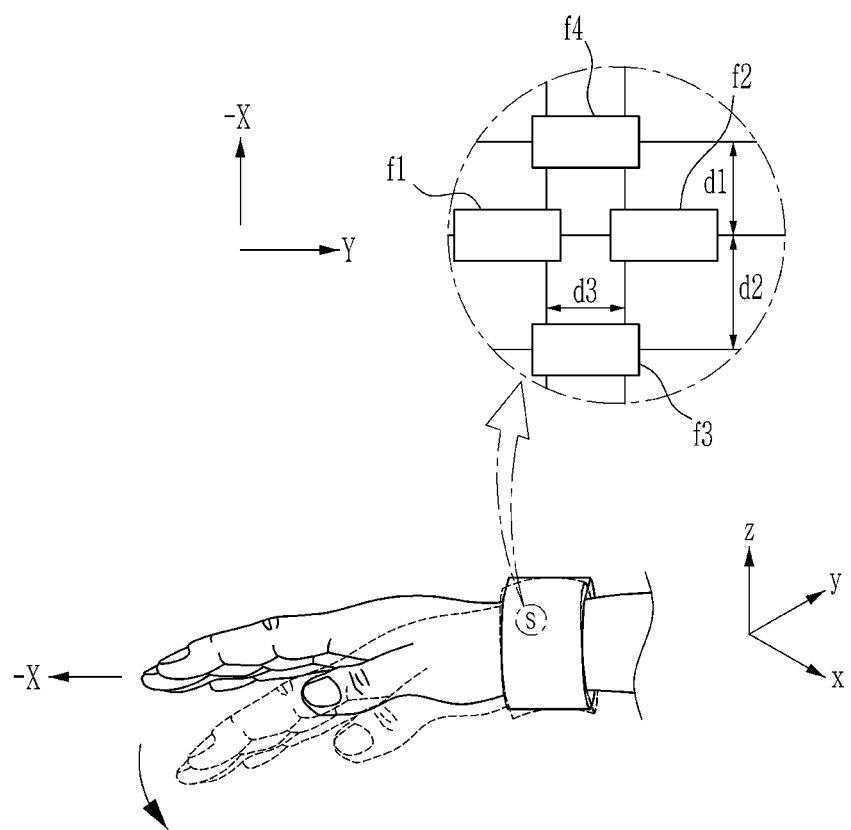
FIG. 8 is a diagram illustrating an example of a change of the band by a movement and a shape change of a wrist that is an example of one of the cause operations when the input device according to the first exemplary embodiment of the present invention is worn on the wrist.

FIG. 7 is an enlarged diagram of a part of a band 100 in which sensors S of an input device according to a first exemplary embodiment of the present invention are positioned, and FIG. 8 is a diagram illustrating an example of a change of the band 100 by a movement and a shape change of a wrist that is an example of one of the cause operations when the input device according to the first exemplary embodiment of the present invention is worn on the wrist.

The input device according to the first exemplary embodiment of the present invention may detect a shape change of the band 100 that is contracted or extended according to a shape change or a movement of a wrist of a user and detect the shape change or the movement of the wrist. Hereinafter, a region of the band 100 contracted or extended according to a shape change or a movement of a wrist is defined as a "flexible area", and the input device according to the first exemplary embodiment of the present invention may detect a shape change and a movement of a wrist region based on a change of a flexible area.

Herein, the "shape change of the wrist region" means a cause operation in which a shape of a wearing portion of a user is changed, so that a part of a flexible area is locally changed, such as extended or contracted, and the "movement" is a spatial movement of a whole wearing portion of a user and means a cause operation in which a flexible area is entirely changed by an acceleration and the like that is imposed and disappears over time.

The input device according to the first exemplary embodiment of the present invention may be mounted with a sensor SS1 at an upper side (a +Z-axis direction) of the band 100, a sensor SS2 at a left side (a −Y-axis direction) of the band 100, a sensor SS3 at a right side (a +Y-axis direction) of the band 100, and a sensor SS4 at a lower side (a −Z-axis direction) of the band 100 and detect a movement of the wrist as illustrated in FIG. 5. FIG. 7 illustrates the case where the sensors are mounted at the four positions, but the present invention is not essentially limited to the four positions, and one or more sensors S may be mounted at one or more positions of the flexible area. The individual sensor S provided on the band 100 may measure and detect a shape change and a movement of the wrist portion of the user at one position in one axis direction or several axis directions.

The flexible area of the band 100 may include fixed units 101 and connection units 102 connecting the fixed units 101.

The connection unit 102 may be extended or contracted according to a movement of the wrist, and as a result, a distance between the fixed units 101 may be changed, and the sensor may detect the movement of the wrist based on the change in the distance between the fixed units 101.

The fixed unit 101 has mass, and may be formed of a material which is little transformed when receiving external force in order to maintain a form of an object. For example, the fixed unit 101 may be formed of a material including metal or a synthetic resin and the like, and the form of the band 100 may be made by connecting or combining the fixed units 101 formed of the material including metal or a synthetic resin. However, the present invention is not limited thereto, and as long as an object has mass and has a property of maintaining an approximately predetermined form, the object may be the fixed unit 101.

The connection unit 102 connects the fixed units 101, and serves to maintain a distance between the fixed units 101 changed according to a movement of the wrist. For example, the plurality of fixed units 101 may be connected by the connection units 102 having the form of a thread. The connection unit 102 may include a flexure, a string, an elastic body, and the like, and may be formed of an elastic object of which a shape is changeable. However, the present invention is not limited thereto, and any kind of object, of which a shape or a length is changeable, may be the connection unit 102. Accordingly, a distance between the fixed units 101 may be changed according to a shape change of the connection unit 102, and the band 100 may be contracted or extended according to the change in the distance between the fixed units 101.

In the present invention, the case where the band 100 is "contracted" or "extended" includes the case where the band 100 formed of an elastic material is shrunk or stretched, and also includes the case where a distance between the fixed units 101 configuring the band 100 is decreased or increased.

Accordingly, the sensor S may detect a change in a distance between the fixed units 101 and detect a movement of the wrist. As illustrated in FIG. 8, when the user bends the wrist in the lower direction, that is, the −Z-axis direction, a distance between the fixed units 101 positioned at the upper side of the band 100 may be increased. For example, the fixed unit f1 and the fixed unit f2 move in the upper direction (the −X-axis direction, that is, a direction of an end portion of a tip of a finger) based on the fixed unit f3, so that distances between the fixed unit f1 and the fixed unit f2 and the fixed unit f3 may be increased, and thus a distance d2 may be increased. Further, the fixed unit f4 moves in the upper direction, that is, the −X-axis direction, based on the fixed units f1 and f2, and is far from the fixed units f1 and f2, and resultingly, is far from the fixed unit f3, and a distance d1 is also increased. When the user bends the wrist in the upper direction, the fixed units f1, f2, and f4 move in the opposite direction to that of the foregoing movements, so that the distances d1 and d2 may be decreased.

When the user bends the wrist in the upper or lower direction like the example, the left-right movements of the fixed units f1 and f2 rarely happen or are very slightly changed, so that the distance d3 between the fixed units 101 may be constantly maintained or may be very slightly changed.

Hereinafter, various sensing methods of detecting a change in a distance between the fixed units 101 according to a movement of a wrist will be described in detail by using FIG. 7 which illustrates a method of detecting a movement of a wrist by the sensor of the input device according to the exemplary embodiment of the present invention.

FIGS. 9 to 12 are diagrams illustrating a method of detecting a shape change or a movement of a wearing portion of a user by using the sensor S of the input device according to the exemplary embodiment of the present invention.

The sensor S of the input device according to the exemplary embodiment of the present invention may measure various physical change values based on a change in a distance between the fixed units 101 according to a shape change and a movement of a wearing portion, for example, a wrist joint region, of a user. For example, the sensor S may measure capacitance, resistance, inductance, voltage, and the like varied according to a change in a distance between the fixed units 101.

The sensor S of the input device according to the exemplary embodiment of the present invention may include a plurality of sensor units. For example, as illustrated in FIG. 9, the sensor may include six capacitance sensor units C1 to C6.

Figure 9:
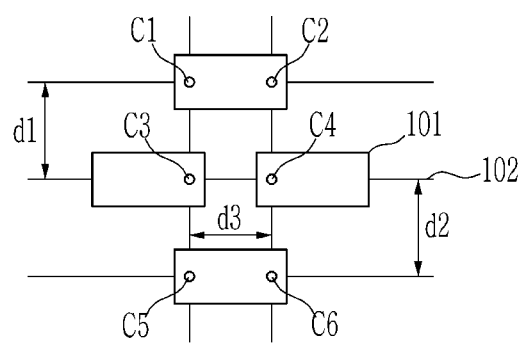
FIGS. 9 to 12 are diagrams illustrating a method of detecting a shape change or a movement of a wearing portion of a user by using a sensor S of the input device according to the exemplary embodiment of the present invention.

The sensor S of FIG. 9 detects a movement of a wrist by using the capacitance sensor units C1 to C6. The sensor S may measure a change in capacitance according to a change in a distance between the fixed units 101 by using the capacitance sensor units C1 to C6. For example, the capacitance sensor units C1 to C6 may be mounted in the fixed units 101 and measure a change in capacitance according to changes in distances d1 to d3 between the fixed units 101 as illustrated in FIG. 9. The sensor S of FIG. 9 may measure a change in a distance between the fixed units 101 based on the capacitance change value, and detect a movement of the wrist based on the form of a capacitance signal indicating the change in the distance between the fixed units 101.

Figure 10:
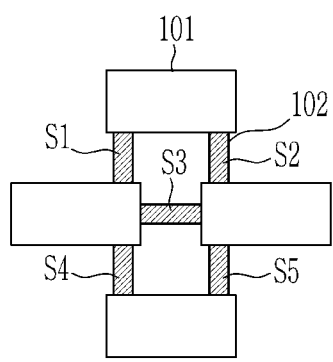

The sensor S of FIG. 10 detects a shape change or a movement of a wrist joint region by using strain gauges S1 to S5 as sensor units. In FIG. 10, a length of the connection unit 102 may be changed according to a movement of a wrist. When a length of the connection unit 102 is changed according to a movement of a wrist, the sensor S may measure a change in a length of each connection unit 102 by measuring a change in resistance of the strain gauges S1 to S5 attached to the connection units 102. The sensor may measure a change in a distance between the fixed units 101 based on a change in a length of each connection unit 102, and detect a movement of a wrist based on a change in resistance of the strain gauges S1 to S5 that is in proportion to a change in a distance between the fixed units 101. For example, the connection unit 102 may be formed of a flexure, and resistance of the attached strain gauges S1 to S5 may be measured by a voltage signal generated by the change in resistance by using Wheastone bridges.

Figure 11:
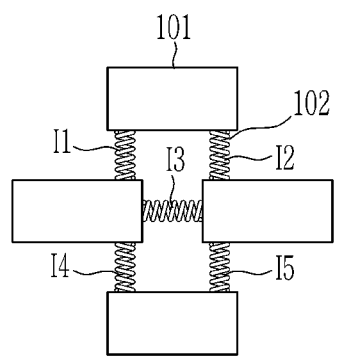

The sensor S of FIG. 11 detects a shape change and a movement of a wrist joint region by using coils I1 to I5. In FIG. 11, the connection units 102 may include the coils I1 to I5. In FIG. 11, when a length of each of coils I1 to I5, that is, the number of times of winding of the coil per unit length, is changed according to a movement of a wrist, inductance of each of the coils l1 to l5 may be changed. The sensor S may measure a change in a distance between the fixed units 101 based on a change in an inductance signal of each of the coils I1 to I5, and detect a shape change and a movement of a wrist joint region based on the change in the inductance signal according to the measured change in the distance between the fixed units 101.

Figure 12:
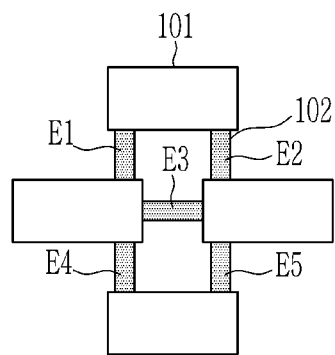

The sensor S of FIG. 12 may detect a shape change and a movement of a wrist joint region by using elastomers or piezoelectric elements E1 to E5. In FIG. 12, compressive force and tensile force are applied to the connection units 102 according to a movement of a wrist and a distance between the fixed units 101 may be changed. When pressure is applied to the connection unit 102 according to the movement of the wrist, voltages applied to the connection units 102 including the piezoelectric elements E1 to E5 or the elastomers E1 to E5 may be changed. The sensor may measure a change in a distance between the fixed units 101 based on a change in a voltage signal applied to the connection unit 102, and detect a shape change and a movement of a wrist based on the measured change in the distance between the fixed units 101. Further, the sensor unit may detect a movement of a wrist by using a conductive elastomer, as well as the piezoelectric element.

The input device according to the first exemplary embodiment of the present invention may detect movements of a wrist at different positions by using one or more sensor units, and thus precisely determine the movements of the wrist.

As illustrated in FIGS. 9 to 12, according to the exemplary embodiment of the present invention, it is possible to generate a signal indicating a shape change or a movement of a wearing portion by using each sensing method operated by the simple scheme. Accordingly, it is possible to detect a shape change and a movement of a wearing portion, for example, a wrist joint region, of a user with low manufacturing cost.

Further, the input device according to the exemplary embodiment of the present invention may use various sensing methods of detecting a change in a distance between the fixed units 101 in addition to the sensing methods presented in FIGS. 9 to 12.

For example, the fixed unit 101 including an optical sensor (not illustrated) may detect light generated from the fixed unit 101 including the light source (not illustrated) and detect a change in a distance between the fixed units 101. The optical sensor may measure a change in an intensity of light varied according to a distance between the fixed units 101 and detect a change in a distance between the fixed units 101.

In this case, as one exemplary embodiment, the light source (not illustrated) and the optical sensor (not illustrated) may also be mounted in the different fixed units 101, respectively, or may also be mounted in one fixed unit 101, and another adjacent fixed unit 101 may has a reflective surface which reflects light emitted from the light source (not illustrated) and transmits the reflected light to a sensor (not illustrated).

Further, as one exemplary embodiment, the fixed units 101 may be connected by the connection units 102 including optical fiber, and light generated from a light source may be transmitted to an optical sensor via the optical fiber. Further, the fixed unit 101 including the light source and another fixed unit 101 including the optical sensor may also be connected through the connection units 102 without optical fiber.

Further, as another sensing method, the fixed unit 101 includes a magnet and a change in a distance between the fixed units 101 may be detected by using a hall sensor (not illustrated) using a hall effect. When a distance between the fixed units 101 is changed, an intensity of a magnetic field generated by the magnet is changed, and the hall sensor may detect a voltage according to a change in an intensity of a magnetic field and detect a change in a distance between the fixed units 101. Further, it is possible to detect a change in a distance between the fixed units 101 by calculating a time of reach of an electromagnetic wave or a sound wave emitted from an electromagnetic wave source mounted in one fixed unit 101 to a receiver (not illustrated) mounted in another fixed unit 101 by using a time of flight (TOF) sensor (not illustrated), as another sensing method.

The sensor S of the input device according to the exemplary embodiment of the present invention is not limited to the foregoing sensing methods, and it may be appreciated that the sensor S includes all of the sensing methods which are capable of measuring a change in a distance between the fixed units 101.

Further, when the fixed unit 101 receives or loses external force or an accelerated speed, a shape and a surface of the fixed unit 101 may be extended or contracted even by a small amount, and in this case, all of the foregoing sensing methods may be applied, and the sensor S may also detect the extension and the contraction of the surface by mounting the foregoing sensors on the surface of the fixed unit 101.

In the above description, the input device in which the plurality of sensors S is mounted in the band 100 and detects a movement of a wrist has been described, but the present invention is not limited thereto, and may detect a shape change or a movement of a wrist joint region by mounting one sensor S in the band 100. The input device in which one sensor S is mounted may detect a shape change or a movement of a wrist joint region by detecting a change in a distance between the plurality of fixed units 101 in an area in which one sensor S is positioned as illustrated in FIG. 6. For example, four fixed units 101 (f1 to f4) may be included in one sensor, and the input device may detect a shape change or a movement of a wrist joint region by detecting changes in distances d1 to d3 between the four fixed units 101.

Figure 13:
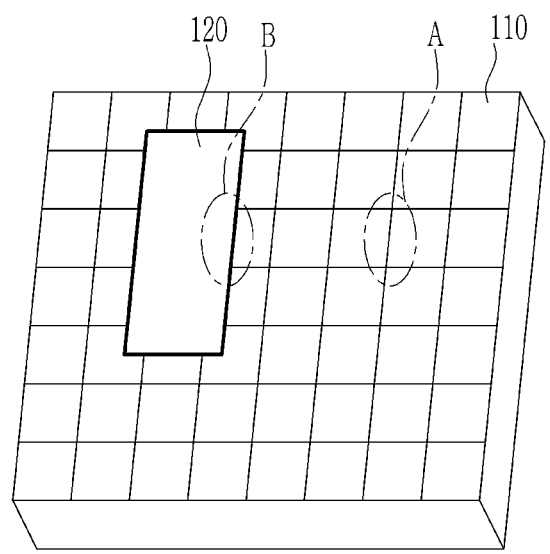
FIG. 13 is a diagram illustrating a position of a sensor of an input device according to a second exemplary embodiment of the present invention.

FIG. 13 is a diagram illustrating a position of a sensor of an input device according to a second exemplary embodiment of the present invention.

A band 100 of the input device according to the second exemplary embodiment of the present invention includes a flexible area 110 which is contracted or extended according to a shape change and a movement of a wearing portion of a user, and a fixed area 120 which is not contracted or extended and maintains the form of the band. A sensor S of the input device according to the second exemplary embodiment of the present invention may be positioned in a partial area A of the flexible area 110, and may also be positioned in a partial area B between the flexible area 110 and the fixed area 120.

The input device according to the second exemplary embodiment of the present invention may variously change the form of the band 100 by using the band 100 including one or more fixed areas 120.

A structure and an operation of the sensor S of the input device according to the second exemplary embodiment of the present invention illustrated in FIG. 13 are the same as the structure and the operation of the sensor S of the input device according to the first exemplary embodiment of the present invention, so that overlapping descriptions will be omitted.

Figure 14:
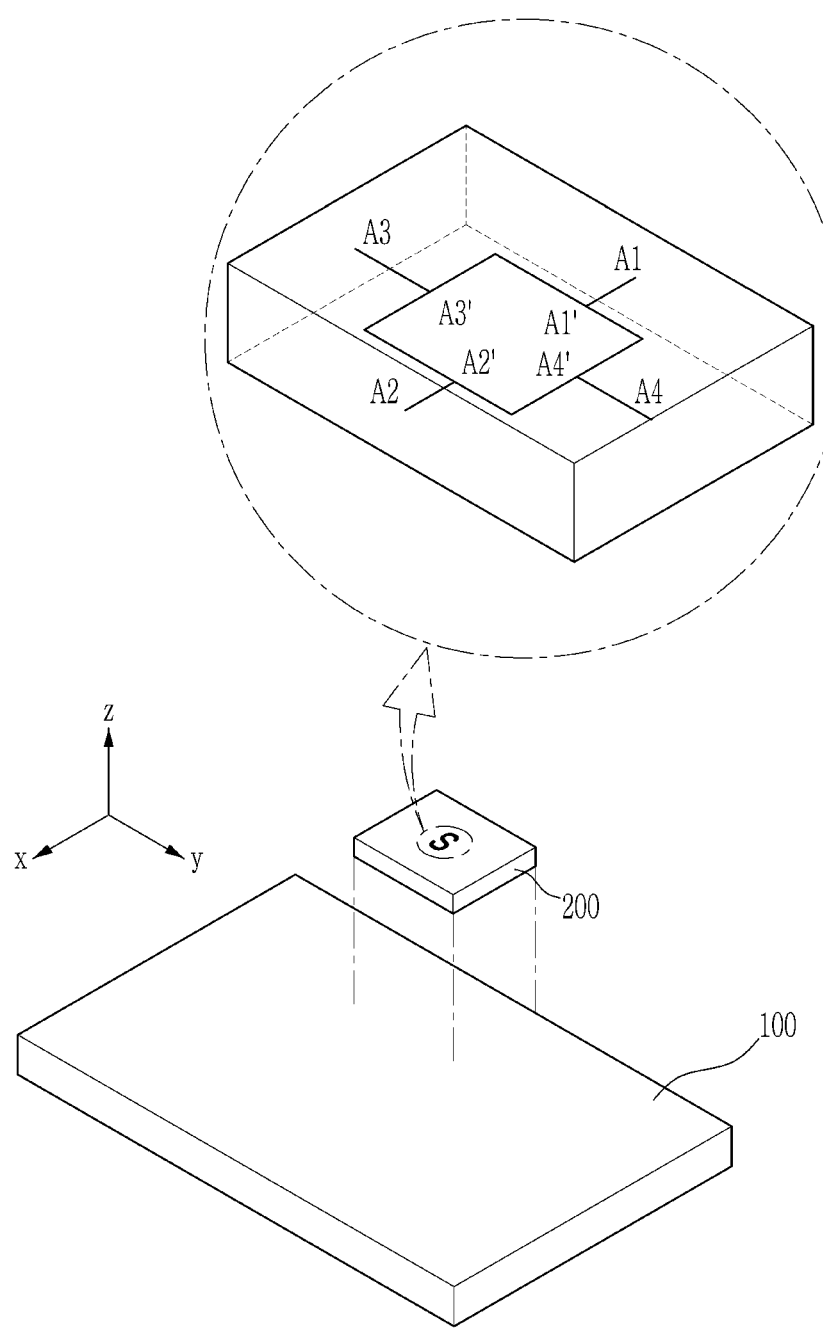
FIG. 14 is a diagram illustrating the state where a sensor of an input device according to a third exemplary embodiment of the present invention is positioned inside a main body.

FIG. 14 is a diagram illustrating the state where a sensor of an input device according to a third exemplary embodiment of the present invention is positioned inside a main body, and indicates that a sensor S detecting a movement of a wrist or an arm may be positioned inside a main body 200. The input device according to the third exemplary embodiment of the present invention may include a fixed unit 101 and a connection unit 102 inside thereof. As illustrated in FIG. 14, the connection unit 102 may be connected with the fixed unit 101 and a sensor housing 500 provided inside the main body 200. When a user moves a wrist or an arm, a distance between the fixed unit 101 and the sensor housing 500 may be changed according to the law of inertia, and the sensor S may detect a change in the distance between the fixed unit 101 and the sensor housing 500.

Figure 16:
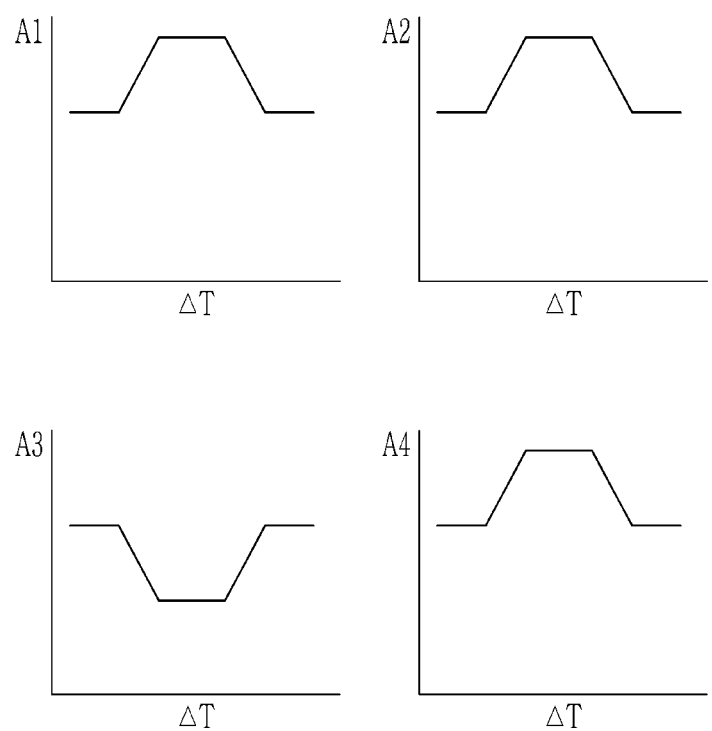
FIG. 16 is a graph of a sensor signal changed according to a movement of an arm of a user in FIG. 15.

FIG. 15 is a diagram illustrating a change in a gap between the sensor housing 500 and the fixed unit 101 by the law of inertia in a movement in which a user moves a right hand from a left side to a right side and stops in the input device according to the third exemplary embodiment of the present invention, and FIG. 16 is a graph of a sensor signal changed according to a movement of an arm of a user in FIG. 15.

The sensor S of the input device according to the third exemplary embodiment of the present invention may detect the foregoing cause operations by a sensor signal corresponding to a change in a distance of a gap formed between the sensor housing 500 and the fixed unit 101. Particularly, to describe based on a movement of an arm including a wrist as an example, a distance of a gap between the sensor housing 500 and the fixed unit 101 may be changed by a movement of a wearing portion of a user. For example, as illustrated in FIG. 10A, when a user moves an arm in a direction from ① to ③, the fixed unit 101 moves by the law of inertia, so that a distance of a gap between point A3 of the sensor housing 500 and point A3' of the fixed unit 101 may be changed from d1 to d2, and may be changed to d1 again. As described above, the distances between points A1 to A4 of the sensor housing 500 and points A1' to A4' of the fixed unit 200 may be temporally changed according to a movement of a wrist joint region or an arm of a user, and signals detected by the sensor according to the changes in the distances at points A1 to A4 may be varied as illustrated in FIG. 16.

In the sensor signals, an increase direction of the sensor signal may also be pre-set so that the sensor signal is increased when a gap between the fixed unit 101 and the sensor housing 500 is increased. A signal graph of FIG. 16 indicates signals of the sensors when the wearing portion of the user moves as illustrated in FIG. 10A in this situation.

Accordingly, the input device according to the third exemplary embodiment of the present invention may detect a change in a distance of a gap formed between the sensor housing 500 and the fixed unit 101 by the same method as the method of detecting, by the input device according to the first exemplary embodiment of the present invention, the change in the distance between the fixed units 101.

For example, the sensors positioned at the points A3 to A3' at which the fixed unit 101 is close to the sensor housing 500 may measure a change in capacitance according to a change in a distance between the fixed unit 101 and the sensor housing 500 and detect a movement of a wrist or an arm.

Further, the gap formed between the fixed unit 101 and the sensor housing 500 of the input device according to the third exemplary embodiment of the present invention is used for measuring a change in resistance by the strain gauge, a change in inductance of the coil, and a change in a voltage by the piezoelectric element by using a flexure, a coil, an elastic body by using the same method as the sensing method of the input device according to the first exemplary embodiment, thereby detecting a movement of a wrist or an arm. Further, when the same movement is detected, the methods of using the foregoing optical sensor, hall sensor, TOF sensor, and the like are also all applicable.

As illustrated in FIG. 14, the sensor S of the input device according to the third exemplary embodiment of the present invention detects a change in a distance of a gap between the sensor housing 500 and the fixed unit 101 at the upper side A1' (the −X-axis direction), the lower side A2' (the +X-axis direction), the left side A3' (the −Y-axis direction), and the right side A4' (the +Y-axis direction) of the fixed unit 101, but the position of the sensor S is not limited thereto, and the sensor S may be positioned in any place in which the sensor S is capable of detecting a change in a gap between the fixed unit 101 and the sensor housing 500.

A change in a distance of a gap at a place at which each sensor S is positioned may be changed according to a movement of a wrist joint region or an arm, so that the input device according to the third exemplary embodiment of the present invention may detect a change in a distance of a gap at one or more places and determine the cause operations, such as a movement of a wrist joint region or an arm.

The sensor housing 500 may also be separately provided inside the main body 200, but another component inside the main body 200 may serve as the sensor housing 500. For example, a part of a circuit board inside the main body 200 may be connected with the connection unit 102 in which the sensor S is mounted to detect a change in a distance between the fixed unit 101 and the circuit board.

Figure 17:
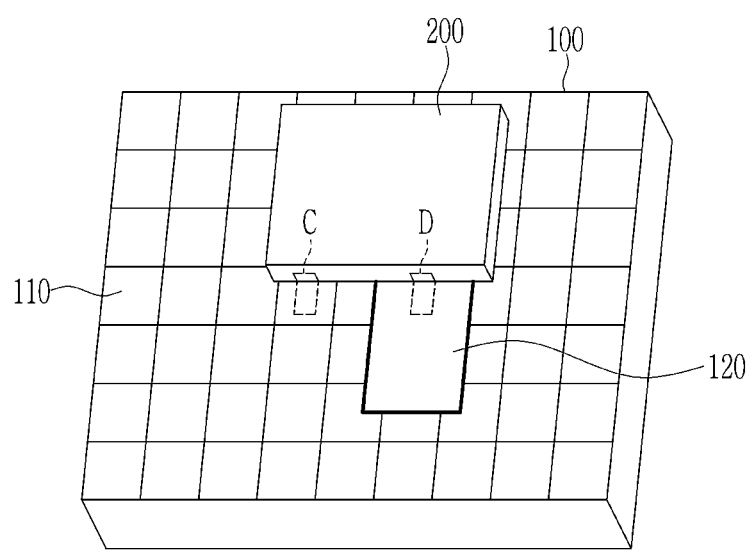
FIG. 17 is a diagram illustrating the state where a sensor of an input device according to a fourth exemplary embodiment of the present invention is positioned between a band and a main body.

FIG. 17 is a diagram illustrating the state where a sensor S of an input device according to a fourth exemplary embodiment of the present invention is positioned between a band 100 and a main body 200.

As illustrated in FIG. 17, the sensors S, which detect a change in a distance of a gap formed between the band 100 and the main body 200 and output a signal corresponding to the detected change in the distance of the gap, may be positioned in spaces C and D between the band 100 and the main body 200. The sensor S may be positioned in at least one place between the space C between the flexible area 110 of the band 100 and the main body 200 and the space D between the fixed area 120 of the band 100 and the main body 200.

In this case, the sensor S positioned in the space between the band 100 and the main body 200 may detect a change in a distance between the band 100 and the main body 200 according to the cause operation including a movement of a wearing portion, for example, a wrist or an arm, of a user wearing the band 100. Further, the sensor S may detect a change in a distance between the band 100 and the main body 200 according to the cause operation including external force applied to the band 100 or the main body 200 by a user or an operation of rubbing, by the user, the band 100 or the main body 200.

The band 100 and the main body 200 may be connected by connection units 102, and the sensor S may detect the cause operation including a movement of a wrist or an arm of a user by the same method as the sensing method of the input device according to the third exemplary embodiment of the present invention.

When the band 100 is connected with the main body 200 with a housing (not illustrated) surrounding the main body 200 interposed therebetween, the sensor S may detect a change in a distance of a gap formed between the main body 200 and the housing (not illustrated) or a change in a distance of a gap formed between the housing (not illustrated) and the band 100 and detect a cause operation.

When the input devices according to the first to fourth exemplary embodiments of the present invention are worn on a wearing portion, for example, a wrist joint, of a user, the input devices may detect a shape change or a movement of the corresponding joint region generated when the user bends the corresponding joint, moves the joint, or holds the main body 200 with the other hand and applies external force. Further, the input devices according to the first to fourth exemplary embodiments of the present invention may detect an operation of swinging an arm, or an operation of pulling, pushing, or pressing and rubbing or stroking a part, for example, the band 100 or the main body 200, of the input device with the other hand as well as a shape change or a movement of a corresponding wrist joint region. The reason is that a distance of a gap between the fixed units 101 within the band 100, a distance of a gap between the flexible area 110 and the fixed area 120 within the band 100, a distance between the sensor housing 500 and the fixed unit 101, or a distance between the band 100 and the main body 200 may be changed according to various cause operations, such as swinging, a movement of an arm, pushing, or pressing and rubbing or stroking the input device with the other hand, as well as the corresponding movement of the wrist.

In the foregoing, it is described that the input device according to the exemplary embodiment of the present invention includes the band 100, but the scope of the present invention may also include an input device which does not include the band 100. Even though the input device does not include the band 100, the input device may detect a cause operation and the like including an operation of a user, external force applied by a user, an effect of rubbing or stroking the input device as described in the input device according to the third exemplary embodiment of the present invention.

Hereinafter, a structure of another band 100 of the input device according to the first exemplary embodiment of the present invention and other structures of third and fourth exemplary embodiments of the present invention related to the band 100 will be described with reference to FIGS. 18 to 34. In this case, another band 100 of the input device according to the second exemplary embodiment of the present invention is the same as the band 100 of the first exemplary embodiment, so that a detailed description thereof will be omitted.

Figure 18:
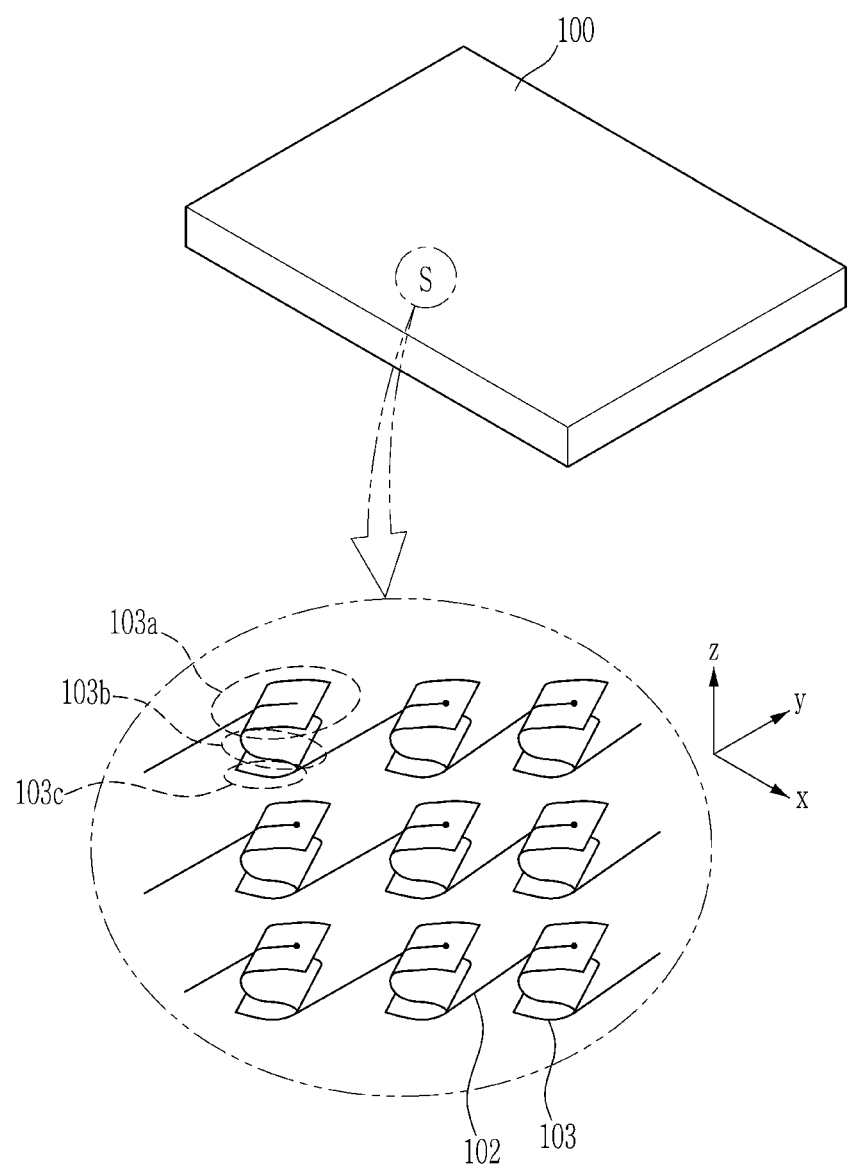
FIG. 18 is an enlarged diagram of a part of a band in which the sensor of the input device according to the first exemplary embodiment of the present invention is positioned.

FIG. 18 is an enlarged diagram of a part of the band 100 in which the sensor of the input device according to the first exemplary embodiment of the present invention is positioned.

A flexible area 110 of the band 100 may include transformation units 103 and connection units 102 connecting the transformation units 103.

A structure of the flexible area 110 of the band 100 of FIG. 18 may include the transformation unit 103 instead of the fixed unit 101 unlike the structure of the flexible area 110 of the band 100 of FIG. 7. It is illustrated that in the band 100 of FIG. 18, a length of the connection unit 102 may be increased or decreased according to a movement of a wrist or the connection unit 102 may pull the transformation unit 103, and as a result, a shape of the transformation unit 103 may be changed. The sensor S may detect a cause operation of a wearing portion based on changes in distances between the constituent elements of the transformation unit 103, such as a distance between an upper portion 103a and a lower portion 103c of the transformation unit 103, the upper portion 103a and a center portion 103b of the transformation unit 103, and a distance between the center portion 103b and the lower portion 103c of the transformation unit 103.

The transformation unit 103 may include at least one of the upper portion 103a, the center portion 103b, and the lower portion 103c as a constituent element. When the transformation unit 103 includes a first constituent element and a second constituent element, the first constituent element may be any one of the upper portion 103a, the center portion 103b, and the lower portion 103c, and the second constituent element may include at least one of the two remaining portions. For example, when the first constituent element is designated to the upper portion 103a, the second constituent element may include at least one of the center portion 103b and the lower portion 103c. When the upper portion 103a is designated as the first constituent element in the transformation unit 103 in which the center portion 103b is omitted, the lower portion 103c may be designated as the second constituent element, and when the lower portion 103c is designated as the first constituent element, the upper portion 103a may be designated as the second constituent element.

The transformation unit 103 may be formed of an elastic object so as to be transformed by the cause operation including an operation in which the transformation unit 103 is pulled by the connection unit 102, a shape change and a movement of a wearing portion of a user, applied external force, or an operation of rubbing the input device. For example, the transformation unit 103 may include a flexure, a string, and an elastic body.

Further, the transformation unit 103 may include the upper portion 103a, the lower portion 103c, and the center portion 103b connecting the upper portion 103a and the lower portion 103c as illustrated in FIG. 18. The transformation unit 103 may be configured by integrally forming the upper portion 103a, the center portion 103b, and the lower portion 103c, or connecting or combining independent components of the separated upper portion 103, center portion 103b, and lower portion 103c.

Accordingly, the form of the transformation unit 103 is not limited to the illustration of FIG. 18, and the transformation unit 103 may have any form in which distances between the upper portion 103a, the center portion 103b, and the lower portion 103c may be changed by a movement of a wearing portion.

The connection unit 102 of the flexible area 110 of FIG. 18 performs the same function as that of the connection unit 102 of the flexible area 110 of FIG. 5, and may be connected to the upper portion 103a, the center portion 103b, or the lower portion 103c of the transformation unit 103 and change a shape of the transformation unit 103 by pulling the connection portion of the transformation unit 103.

The transformation unit 103 may also be contracted or extended according to movements of all wearing portions, for example, a wrist, of a user, as well as the connection unit 102, and thus, the flexible area 110 of FIG. 18 may also be contracted or extended.

Figure 19:
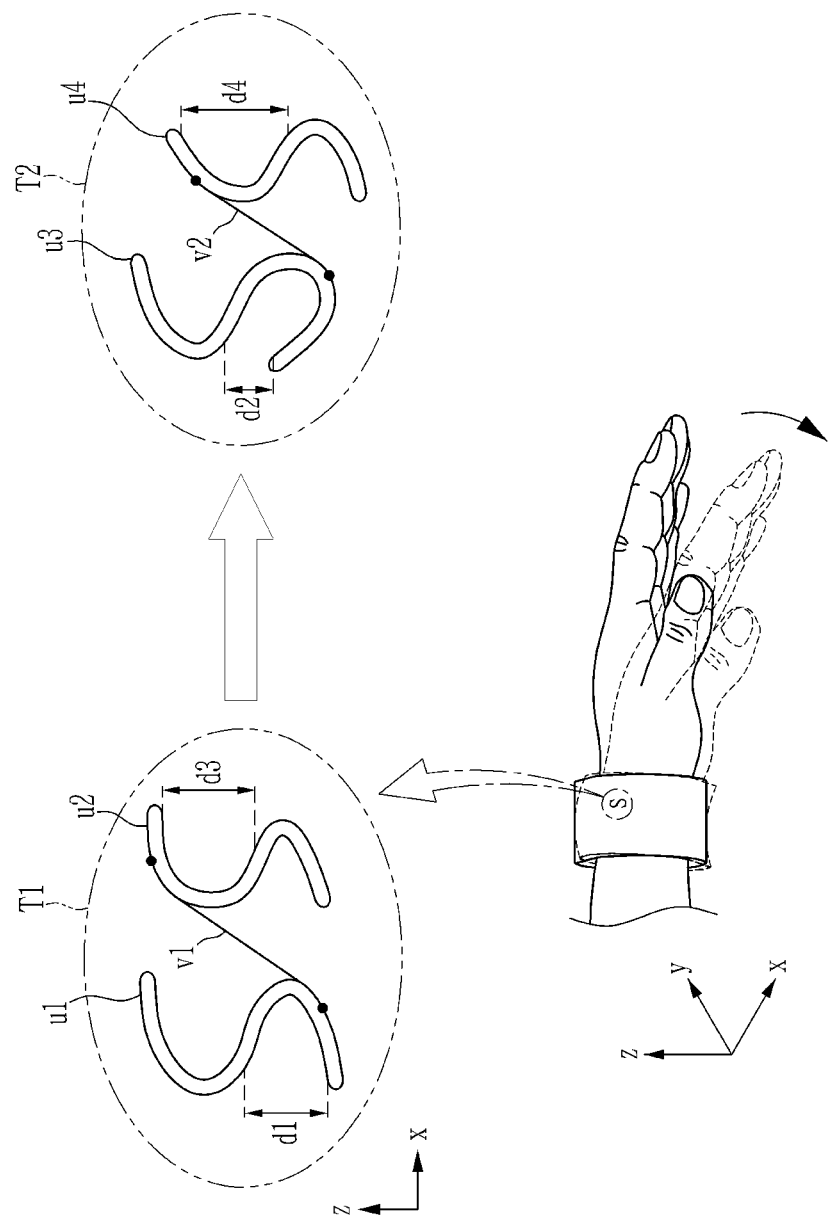
FIG. 19 is a diagram illustrating a change of a transformation unit by a movement and a shape change of a wrist when the input device according to the first exemplary embodiment of the present invention including the band of FIG. 18 is worn on the wrist.

FIG. 19 is a diagram illustrating a change of the transformation unit by a movement and a shape change of a wrist when the input device according to the first exemplary embodiment of the present invention including the band of FIG. 18 is worn on the wrist.

As illustrated in FIG. 19, when a user bends a wrist in the −Z-axis direction that is the lower direction, the connection unit 102 (v1) and the transformation units 103 (u1 and u2) positioned at the upper side of the band 100 may be changed from form T1 to form T2. When the user bends the wrist in the lower direction, a shape of an upper portion (the +Z-axis direction) of the wrist may be changed to a prominent shape, and thus, the lower portion 103c of the transformation unit 103 (u1) may be pressed in the Z-axis direction. When the lower portion 103c of the transformation unit 103 (u1) is pressed by the shape change or the movement of the wrist, the lower portion 103c of the transformation unit 103 (u1) may be transformed in the Z-axis direction like the transformation unit 103 (u3), and a distance between the upper portion 103a and the lower portion 103c of the transformation unit 103 (u1) may be changed from d1 to d2. In this case, the connection unit 102 (v1) connected to the lower portion 103*c* of the transformation unit 103 (u1) and the upper portion 103*a* of the transformation unit 103 (u2) is pulled in the −X-axis direction, thereby pulling the upper portion 103*a* of the transformation unit 103 (u2) in the −X-axis direction. The upper portion 103*a* of the transformation unit 103 (u2) is pulled in the −X-axis direction and a right portion of the upper portion 103*a* may be transformed in the Z-axis direction like the form of the transformation unit 103 (u4), and thus a distance between the upper portion 103*a* and the lower portion 103*c* may be changed from d3 to d4. As can be seen in the example, the sensor S may detect the cause operation by measuring the changes in the distances between the constituent elements, that is, the upper portion 103*a*, the center portion 103*b*, and the lower portion 103*c*, of the transformation unit 103 according to the cause operation including the shape change and the movement of the wrist of the user, or the like.

FIGS. 20 to 23 are diagrams illustrating a method of detecting, by the sensor S of the input device according to the exemplary embodiment of the present invention, a change in a distance between the constituent elements inside the transformation unit.

The method of detecting a change in a distance between the internal constituent elements of the transformation unit 103 is the same as all of the foregoing methods of detecting a change in a distance between the fixed units 101, so that a detailed description will be omitted.

Figure 20:
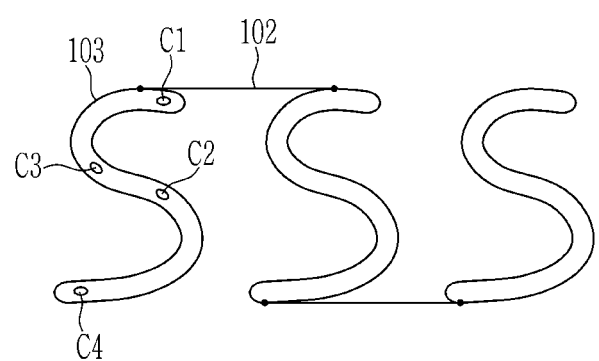
FIGS. 20 to 23 are diagrams illustrating a method of detecting, by the sensor of the input device according to the exemplary embodiment of the present invention, a change in a distance between constituent elements inside a transformation unit.

As illustrated in FIG. 20, the sensor S of the input device according to the exemplary embodiment of the present invention may include one or more capacitance sensor units C1 to C4. The capacitance sensor units C1 to C4 may be positioned as illustrated in FIG. 20 and measure capacitance according to a change in a distance between the constituent elements of the transformation unit 103. The sensor S of FIG. 20 may measure a change in a distance between the constituent elements of the transformation unit 103 based on a capacitance change value, and detect a shape change or a movement of a wearing portion of a user based on the measured change in the distance.

Figure 21:
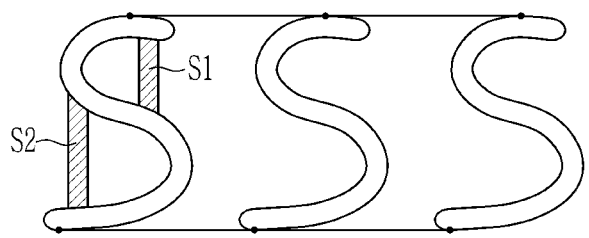

Further, as illustrated in FIG. 21, the sensor S of the input device according to the exemplary embodiment of the present invention may detect a shape change or a movement of a wearing portion of a user by using strain gauges S1 and S2. When lengths of the strain gauges S1 and S2 connecting the constituent elements of the transformation unit 103 are changed according to a movement of a wrist of a user, resistance of the strain gauges S1 and S2 may be changed and the sensor may detect the movement of the wrist based on a change in resistance of the strain gauges S1 and S2.

Figure 22:
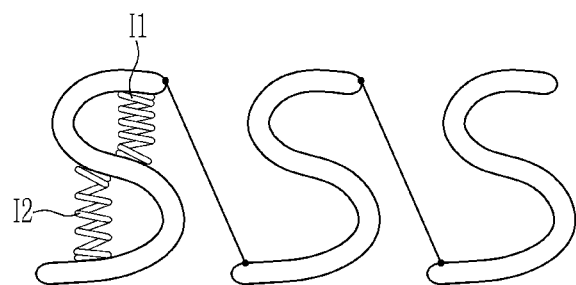

Further, as illustrated in FIG. 22, the sensor of the input device according to the exemplary embodiment of the present invention may detect a shape change or a movement of a wearing portion of a user by using coils I1 and I2. When lengths of the coils I1 and I2 connecting the constituent elements of the transformation unit 103 are changed according to a movement of a wrist of a user, inductance of the coils I1 and I2 may be changed and the sensor S may detect the movement of the wrist based on a change in inductance of the coils I1 and I2.

Figure 23:
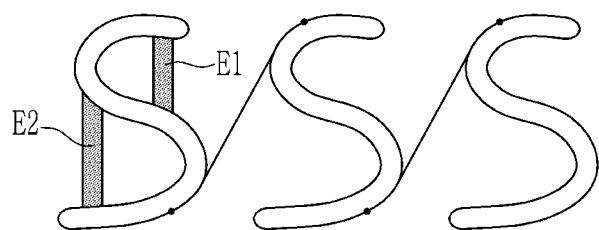

Further, as illustrated in FIG. 23, the sensor S of the input device according to the exemplary embodiment of the present invention may detect a shape change or a movement of a wearing portion of a user by using piezoelectric elements E1 and E2 or conductive elastomers. For example, when pressure is applied to the piezoelectric elements E1 and E2 connecting the constituent elements of the transformation unit 103 according to a movement of a wrist of a user, voltages applied to the piezoelectric elements E1 and E2 may be changed, and the sensor S may detect the movement of the wrist based on the change in the voltage signal.

Further, in order to detect a change in a distance between the constituent elements of the transformation unit 103, the input device according to the exemplary embodiment of the present invention may use the foregoing optical sensor, hall sensor, and TOF sensor, and the like, in addition to the sensor, and may also include any kind of sensing method which is capable of measuring a distance between the constituent elements inside the transformation unit 103.

The connection unit 102 may connect the upper portion 103*a* and the lower portion 103*c* of the transformation unit 103, and also connect the upper portion 103*a* and the upper portion 103*a* of the transformation unit 103 or connect the lower portion 103*c* and the lower portion 103*c* of the transformation unit 103. Further, the connection unit 102 may also connect the upper portion 103*a* or the lower portion 103*c* of the transformation unit 103 and a center portion 103*b* of another transformation unit 103.

FIGS. 24 to 27 are diagrams illustrating another form of the transformation unit 103 of the input device according to the exemplary embodiment of the present invention. The transformation unit 103 of FIGS. 20 to 23 has the form in which the upper portion 103*a* is separated from the lower portion 103*c*, and a change in a distance between the upper portion 103*a* and the lower portion 103*c* may be detected by the same method as that of the transformation unit 103 of FIGS. 19 to 23.

Figure 24:
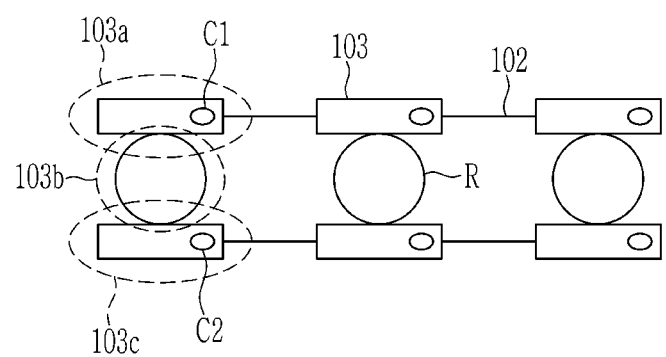
FIGS. 24 to 27 are diagrams illustrating another form of the transformation unit of the input device according to the exemplary embodiment of the present invention.
Figure 25:
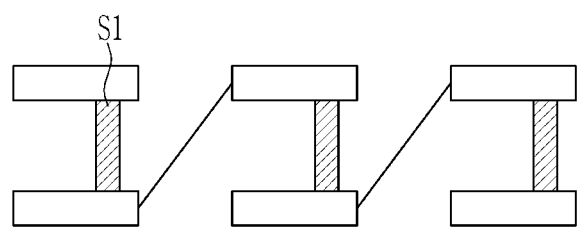
Figure 26:
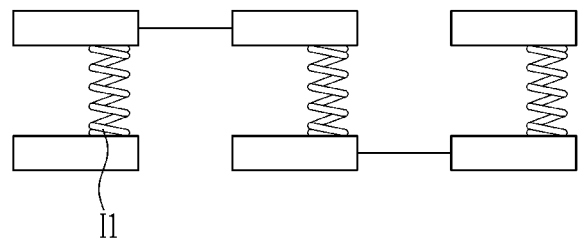
Figure 27:
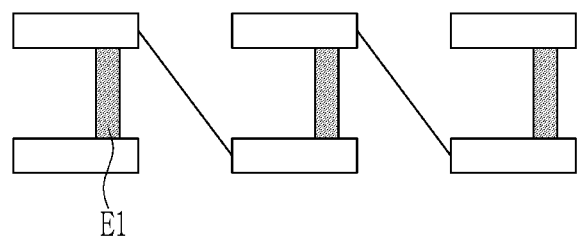

FIG. 24 illustrates a configuration that a center portion 103*b* having a shape of a roller, a sphere, and a polygon, such as a pyramid, having apexes, supports an upper portion 103*a* and a lower portion 103*c* so that the upper portion 103*a* and the lower portion 103*c* are easily inclined, and capacitance sensors are mounted in the upper portion 103*a* and the lower portion 103*c*. FIGS. 25, 26, and 27 illustrate the configurations in which the center portion 103*b* is omitted, and a coil, a strain gauge, a piezoelectric element, an elastomer, and the like are mounted in the upper portion 103*a* and the lower portion 103*c* in a sandwich type.

In FIG. 24, the input device detects a change in a distance between the upper portion 103*a* and the lower portion 103*c* by measuring a change value of capacitance, and in FIG. 25, the input device detects a change in a distance between the upper portion 103*a* and the lower portion 103*c* by measuring a change value of resistance of the strain gauge S1. In FIG. 26, the input device detects a change in a distance between the upper portion 103*a* and the lower portion 103*c* by measuring a change value of inductance of the coil I1, and in FIG. 27, the input device detects a change in a distance between the upper portion 103*a* and the lower portion 103*c* by measuring a change value of a voltage by the piezoelectric element E1.

In the transformation units 103 of FIGS. 24 to 27, the upper portion 103*a* is separated from the lower portion 103*c*, so that there may be a need for a component which is capable of supporting the upper portion 103*a* and the lower portion 103*c*. In this case, as illustrated in FIG. 20, a roller shaft R approximately having a shape of a cylinder, a sphere, or a pyramid (not illustrated) may be positioned between the upper portion 103*a* and the lower portion 103*c* of the transformation unit 103 so as to perform a function of the center portion 103*b*. When the roller shaft R is positioned between the upper portion 103*a* and the lower portion 103*c* of the transformation unit 103, the roller shaft R may support the upper portion 103a and the lower portion 103c and make the constituent elements of the transformation unit 103 to have large inclinations according to the pulling of the transformation unit 103 by the connection unit 102, so that the sensor S may easily detect a change in a distance between the constituent elements according to the inclinations of the constituent elements of the transformation unit 103.

Figure 28:
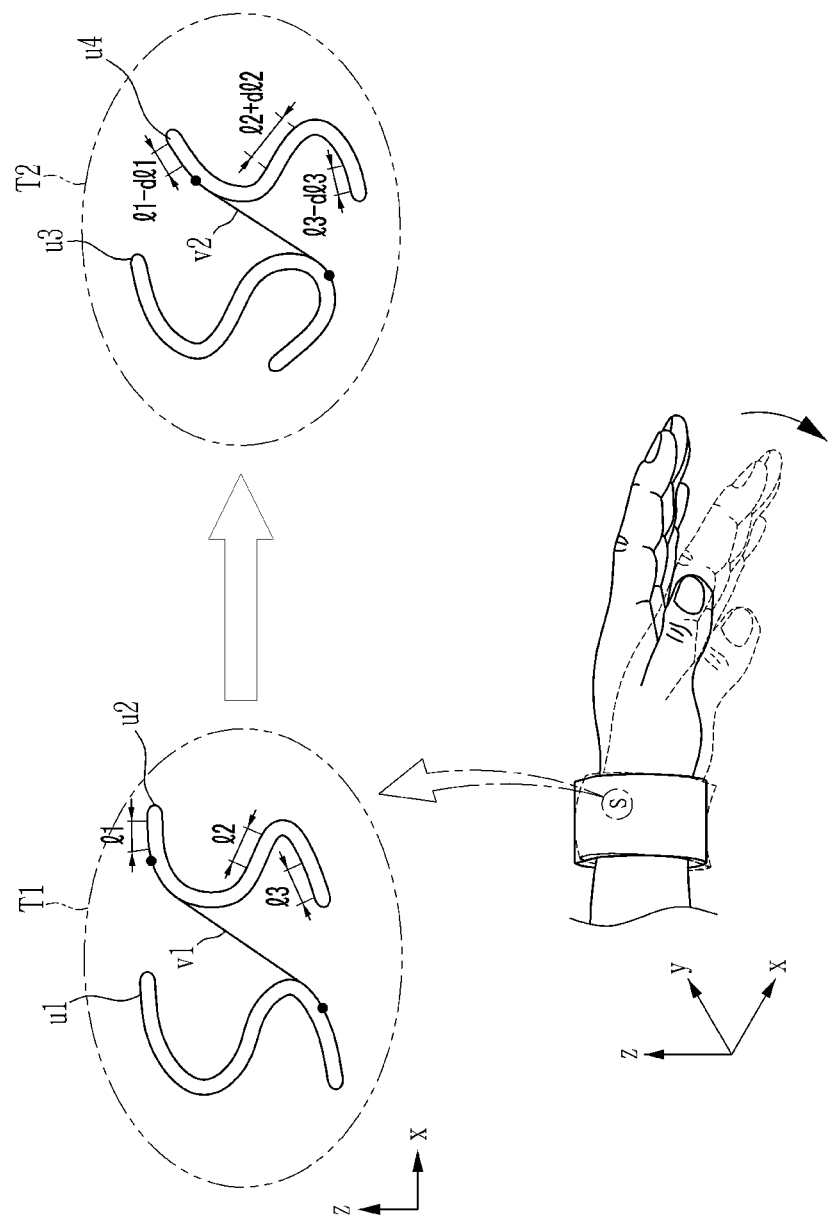
FIG. 28 is a diagram illustrating another shape change of the transformation unit by a cause operation including a movement and a shape change of a wrist and the like when the input device according to the first exemplary embodiment of the present invention including the band of FIG. 18 is worn on the wrist.

FIG. 28 is a diagram illustrating another shape change of the transformation unit according to a cause operation including a movement and a shape change of a wrist when the input device according to the first exemplary embodiment of the present invention including the band of FIG. 18 is worn on the wrist.

As illustrated in FIG. 28, when a user bends a wrist in the −Z-axis direction that is the lower direction, the connection unit 102 (v1) and the transformation units 103 (u1 and u2) positioned at the upper side of the band 100 may be changed from form T3 to form T4. When the user bends the wrist in the lower direction, a shape of an upper portion of the wrist may be changed to a prominent shape, and thus, the lower portion 103c of the transformation unit 103 (u1) may be pressed in the +Z-axis direction. When the lower portion 103c of the transformation unit 103 (u1) is pressed a shape change or a movement of the wrist, the lower portion 103c of the transformation unit 103 (u1) may be transformed in the +Z-axis direction like the form of the transformation unit 103 (u3). In this case, the connection unit 102 v1 connected to the lower portion 103c of the transformation unit 103 (u1) and the upper portion 103a of the transformation unit 103 (u2) is pulled in the −X-axis direction, thereby pulling the upper portion 103a of the transformation unit 103 (u2) in the −X-axis direction. The upper portion 103a of the transformation unit 103 (u2) is pulled in the −X-axis direction, so that a right portion of the upper portion 103a may be transformed in the +Z-axis and −X-axis directions in the same form as that of the transformation unit 103 (u4), and thus, a length of a part of each of the constituent elements of the transformation unit 103 (u2) may be changed. For example, a length of a part of the upper portion 103a of the transformation unit 103 (u2) may be changed from I1 to I1-dI1, and a length of a part of the center portion 103b of the transformation unit 103 (u2) may be changed from I2 to I2+dI2. Further, a length of a part of the lower portion 103c of the transformation unit 103 (u2) may be changed from I3 to I3-dI3.

In this case, the sensor S may detect the cause operation by measuring the changes in the lengths of the constituent elements, that is, the upper portion 103a, the center portion 103b, and the lower portion 103c, of the transformation unit 103 according to the cause operation including the shape change and the movement of the wrist of the user, or the like.

As described above, a shape, such as a length of a part, of the transformation unit 103 may be changed according to a shape change, such as extension, contraction, bending, and curving, of the constituent element of the transformation unit 103 based on the cause operation.

Hereinafter, another method of detecting shape changes, such as extension, contraction, bending, and curving, of the constituent elements of the transformation unit 103 will be described with reference to FIGS. 29 to 32.

FIGS. 29 to 32 are diagrams illustrating a method of detecting, by the sensor of the input device according to the exemplary embodiment of the present invention, shape changes of the constituent elements of the transformation unit.

Figure 29:
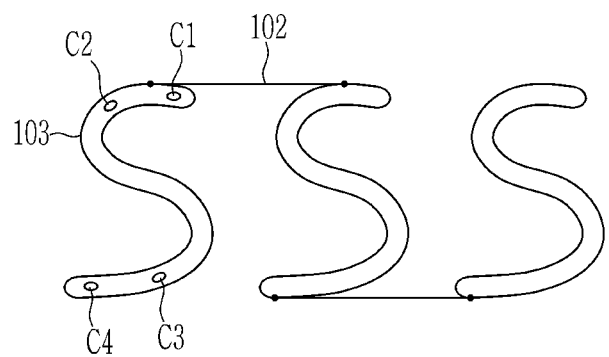
FIGS. 29 to 32 are diagrams illustrating a method of detecting, by the sensor of the input device according to the exemplary embodiment of the present invention, shape changes of the constituent elements of the transformation unit.
Figure 30:
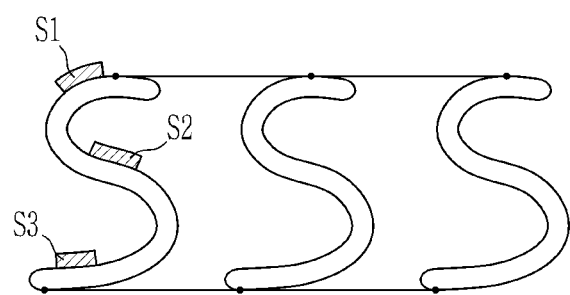
Figure 31:
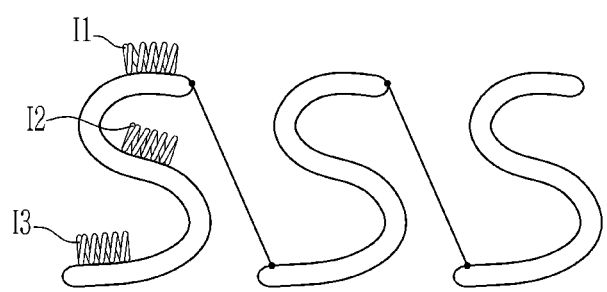
Figure 32:
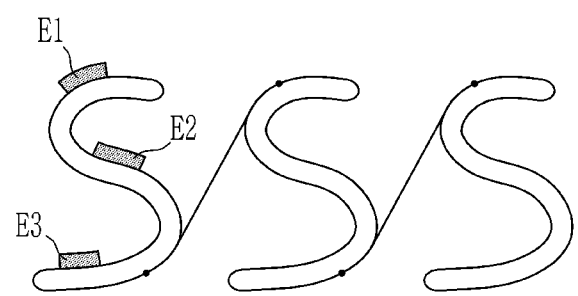

FIGS. 29 and 30 illustrate the state where the sensors S exemplified in FIGS. 20 to 23 are mounted on surfaces of the constituent elements of the transformation unit 103 so as to measure a shape change of the transformation unit 103. When a shape of the transformation unit 103 is changed by a shape change or a movement of a wrist of a user, the sensor S may detect the shape change or the movement of the wrist of the user by measuring shape changes of the upper portion 103a, the center portion 103b, and the lower portion 103c according to extension, contraction, bending, curving, torsion, and the like.

As described above, the capacitance sensor units C1 to C4, the strain gauges S1 to S3, the coils I1 to I3, the piezoelectric elements or elastomers E1 to E3 may be mounted on the surface of the constituent element, that is, the upper portion 103a, the center portion 103b, or the lower portion 103c, of the transformation unit 103. When the transformation unit 103 is pulled according to a movement of a wrist of a user and a part of each of the constituent elements is extended or contracted as described with reference to FIG. 28, the sensor S may detect cause operations by measuring a capacitance change value, resistance change values of the strain gauges S1 to S3, inductance change values of the coils I1 to I3, or voltage change values by the piezoelectric elements E1 to E3 or elastomers. Further, as described above, the sensor S may also detect the cause operations by using a photoelectronic sensor (not illustrated), the hall sensor (not illustrated), a time of flight sensor, and the like.

Further, in another exemplary embodiment of the transformation unit 103 illustrated in FIGS. 24 to 27, the sensor S may detect a change in a length of the upper portion 103a or the lower portion 103c of the transformation unit 103 according to the shape change of the upper portion 103a or the lower portion 103c of the transformation unit 103 by the same method as that described with reference to FIGS. 29 to 32.

The method of detecting cause operations including a shape change or a movement of a wrist by using the transformation unit 103 may include a method of obtaining a signal of a sensor corresponding to a change in a distance between the constituent elements of the transformation unit 103 based on the shape change of the transformation unit 103 and a method of obtaining a signal of a sensor corresponding to shape changes, such as changes in the lengths of the constituent elements, of the transformation unit 103.

Figure 33:
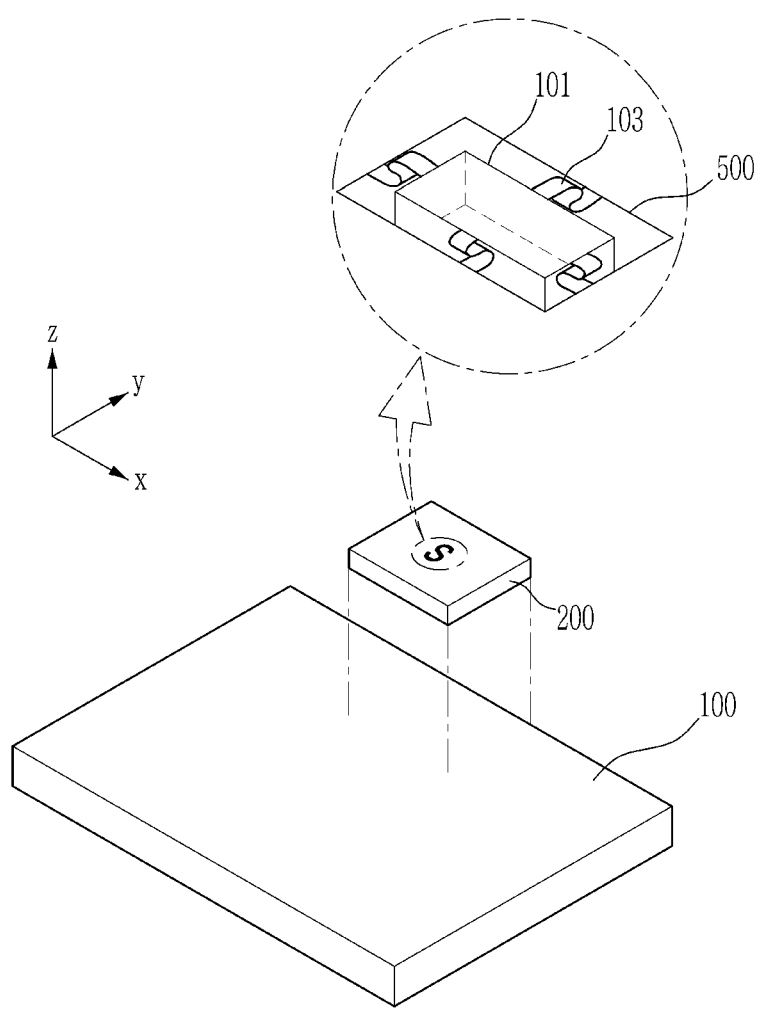
FIG. 33 is a diagram illustrating the case where the input device according to the third exemplary embodiment of the present invention includes a transformation unit.

FIG. 33 is a diagram illustrating the case where the input device according to the third exemplary embodiment of the present invention includes a transformation unit 103.

As illustrated in FIG. 33, the transformation unit 103 may be positioned between a sensor housing 500 of a main body 200 and a fixed unit 101 inside the sensor housing 500, or between the sensor housing 500 and an object having predetermined mass. One portion of an upper portion 103a and a lower portion 103c of the transformation unit 103 may be connected to the fixed unit 101, and the remaining portion may be connected to the sensor housing 500. In this case, the transformation unit 103 may also be directly connected to the fixed unit 101 and the sensor housing 500, and may also connected to the fixed unit 101 and the sensor housing 500 via a connection unit 102.

In this case, the input device may also be configured so that the fixed unit 103 or an object having mass is not used, and one end of the transformation unit 103 may be connected to one side surface of the sensor housing 500 and the other end of the transformation unit 103 may be connected to the other side surface of the sensor housing 500, so that the center portion of the transformation unit 103 may serve as the fixed unit 103 or the object having mass.

In the case where a wearing portion of a user moves, when the fixed unit 101 inside the sensor housing 500 moves by the law of inertia and a distance between the fixed unit 101 and the sensor housing 500 is changed, a shape of the upper portion 103a, the center portion 103b, or the lower portion 103c of the transformation unit 103 connected to the fixed unit 101 and the sensor housing 500 may be changed. Accordingly, the sensor S may detect a change in a distance between the constituent elements of the transformation unit 103 or changes in lengths of the constituent elements, and may output a signal corresponding to a change in a distance of a gap formed between the fixed unit 101 and the sensor housing 500 or a shape change of the transformation unit 103 based on the detected change in the distance between the constituent elements of the transformation unit 103 or changes in the lengths of the constituent elements.

Figure 34:
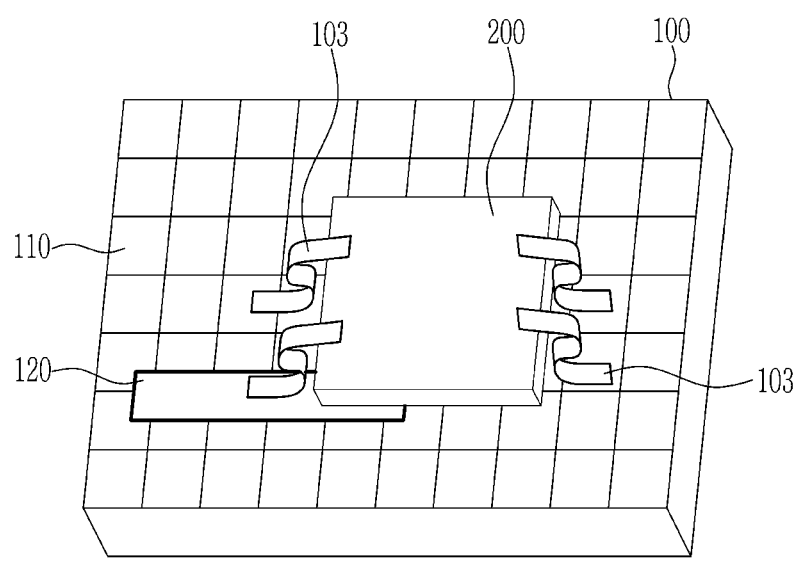
FIG. 34 is a diagram illustrating the case where the input device according to the fourth exemplary embodiment of the present invention includes a transformation unit.

FIG. 34 is a diagram illustrating the case where the input device according to the fourth exemplary embodiment of the present invention includes a transformation unit 103.

As illustrated in FIG. 34, the transformation unit 103 may be positioned between the band 100 and the main body 200 to connect the band 100 and the main body 200. One of the upper portion 103a and the lower portion 103c of the transformation unit 103 may be connected to the band 100, and the remaining portion may be connected to the main body 200. In this case, the transformation unit 103 may be directly connected to the band 100 and the main body 200, and may also be connected to the band 100 and the main body 200 via the connection unit 102.

Further, the transformation unit 103 may be connected with at least one of the flexible area 110 and the fixed area 120 of the band 100 and the main body 200, and it is possible to detect a change in a distance between the band 100 and the main body 200 and a shape change of the transformation unit 103 according to a cause operation of a user by using the transformation unit 103.

As described above, the input device according to the exemplary embodiment of the present invention may include the fixed units 101 and detect a cause operation by detecting a change in a distance between the fixed units 101, and may include the transformation units 103 and detect a cause operation by detecting shape changes of the constituent elements of the transformation unit 103.

Further, the input device according to the exemplary embodiment of the present invention may include at least one of the fixed unit 101, the connection unit 102, and the transformation unit 103 according to the exemplary embodiment and detect a cause operation of a user.

Figure 35:
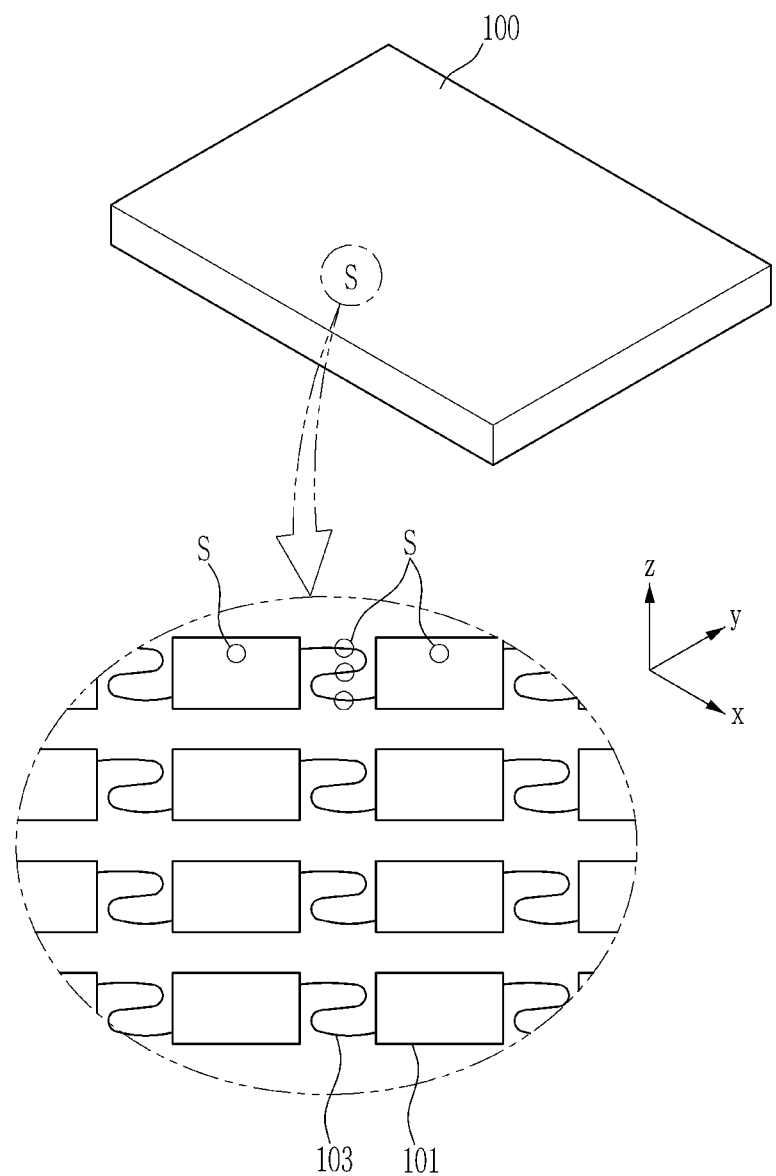
FIG. 35 is a diagram illustrating the case where the input device according to the first exemplary embodiment of the present invention includes fixed units and transformation units.

FIG. 35 is a diagram illustrating the case where the input device according to the first exemplary embodiment of the present invention includes the fixed units 101 and the transformation units 103.

As illustrated in FIG. 35, the input device according to the exemplary embodiment of the present invention may include the fixed units 101 and the transformation units 103 connecting the fixed units 101. In this case, the transformation unit 103 may be contracted or extended like the connection unit 102, so that a shape of the transformation unit 103 may be changed, and a distance between the fixed units 101 may be changed based on a shape change of the transformation unit 103. Accordingly, the input device of FIG. 35 may detect a change in a distance between the fixed units 101 and detect a cause operation, and may also detect a shape change of the transformation unit 103 and detect a cause operation.

Further, the input device may detect a change in a distance between the fixed unit 101 and the transformation unit 103 and detect a cause operation.

Hereinafter, a first exemplary embodiment related to a main body 200 of the present invention will be described in detail with reference to FIGS. 36 to 43. The first exemplary embodiment related to the main body 200 of the present invention will be described based on the case where the input device according to the exemplary embodiment of the present invention includes the fixed unit 101.

Figure 36:
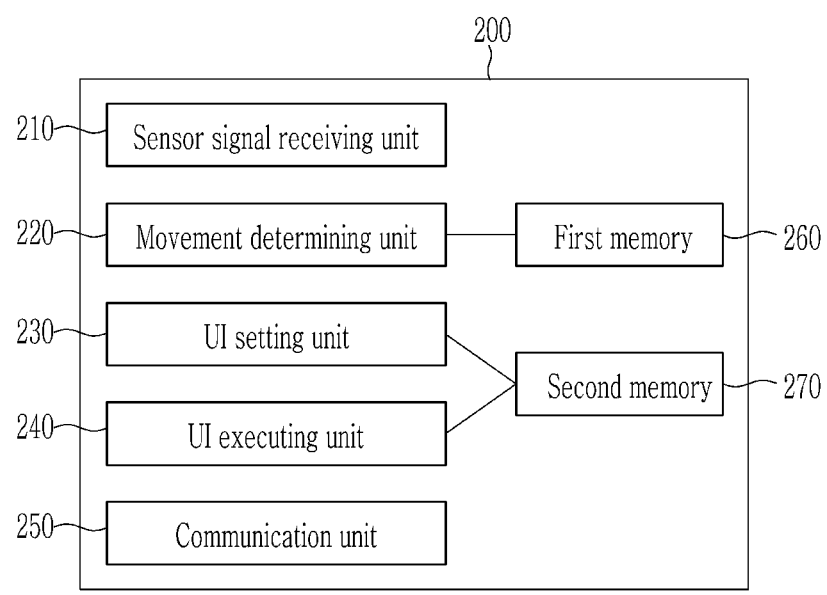
FIG. 36 is a block diagram illustrating a first exemplary embodiment related to a main body of the present invention.

FIG. 36 illustrates the first exemplary embodiment related to the main body 200 of the present invention, and the first exemplary embodiment related to the main body 200 may be included in the input device according to the first to fourth exemplary embodiments of the present invention. Accordingly, it is possible to operate the input device according to the first to fourth exemplary embodiments of the present invention by using the first exemplary embodiment related to the main body 200 of the present invention.

Figure 38:
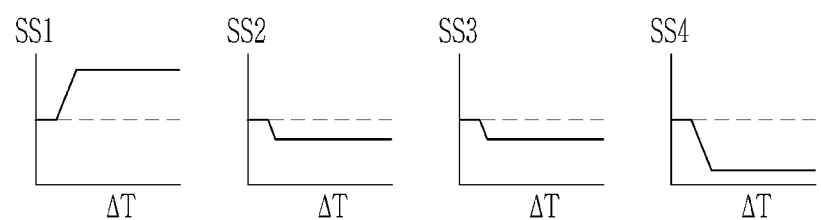
FIGS. 38 and 39 are graphs illustrating a signal obtained by detecting an up and down movement of the wrist of FIG. 37.
Figure 39:
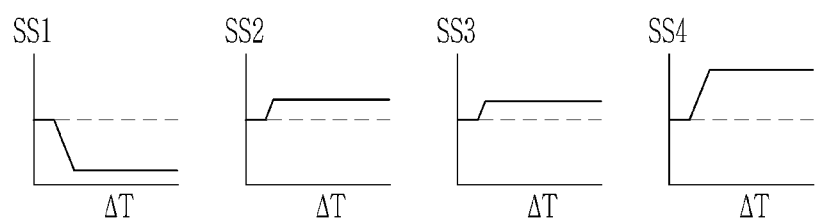
Figure 41:
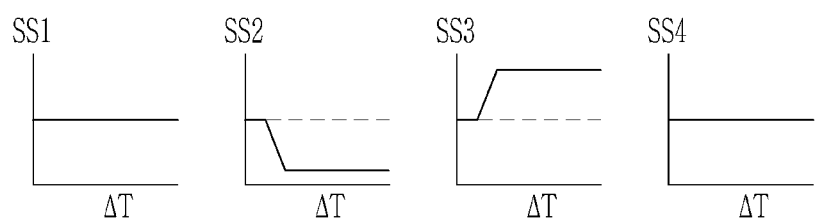
FIGS. 41 and 42 are graphs illustrating a signal obtained by detecting a left and right movement of the wrist of FIG. 40.
Figure 42:
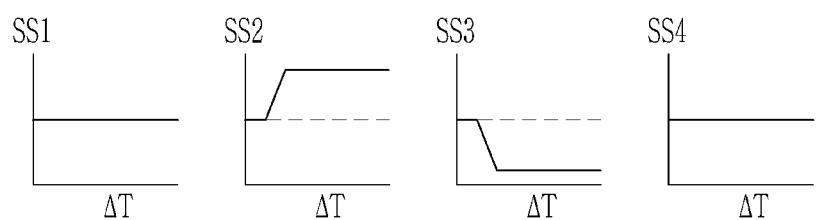
Figure 43:
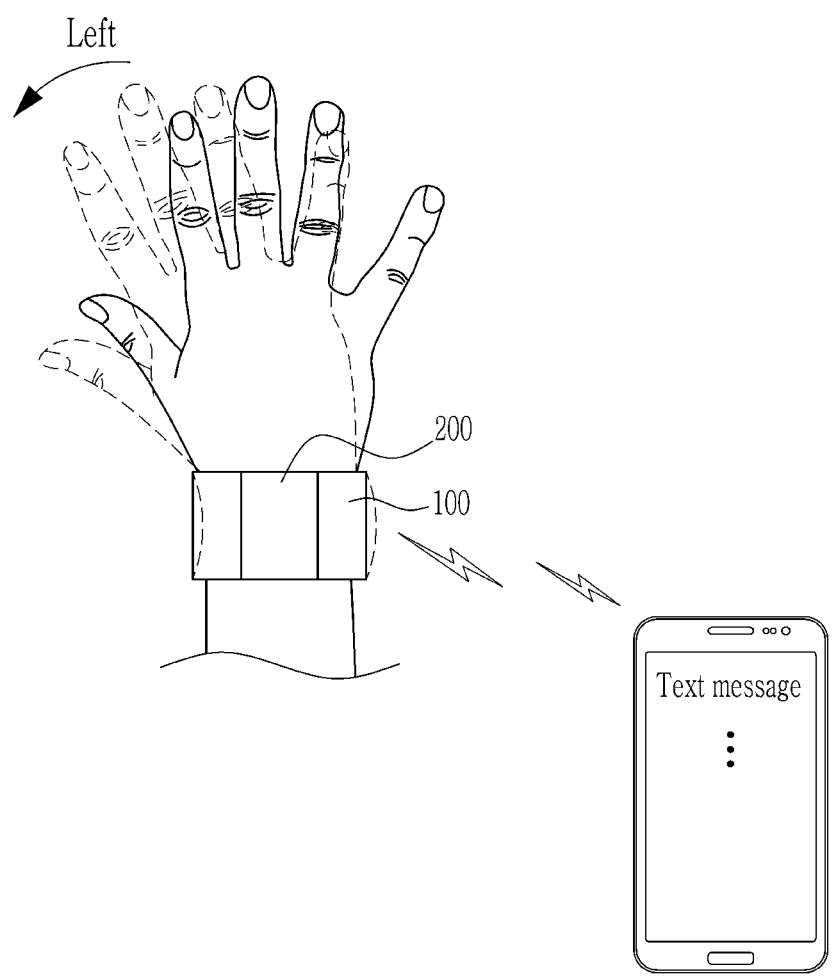
FIG. 43 is a diagram illustrating an example in which a UI defined by a user is executed according to a movement of a joint region of a wrist in the first exemplary embodiment related to the main body of the present invention.

FIG. 36 is a block diagram illustrating the first exemplary embodiment related to the main body of the present invention. FIG. 37 is a diagram illustrating an example in which a user wears the input device according to the exemplary embodiment of the present invention and bends a joint of a wrist in upper and lower directions. FIGS. 38 and 39 are graphs illustrating a signal obtained by detecting an up and down movement of the wrist of FIG. 37. FIG. 40 is a diagram illustrating an example in which a user wears the input device according to the exemplary embodiment of the present invention and moves a wrist in left and right directions, and FIGS. 41 and 42 are graphs illustrating a signal obtained by detecting a left and right movement of the wrist of FIG. 40. FIG. 43 is a diagram illustrating an example, in which a UI defined by a user is executed according to a movement of a joint region of a wrist in the first exemplary embodiment related to the main body of the present invention.

As illustrated in FIG. 36, the first exemplary embodiment related to the main body 200 of the present invention includes a sensor signal receiving unit 210, a movement determining unit 220, a UI setting unit 230, a UI executing unit 240, a communication unit 250, a first memory 260, and a second memory 270.

The sensor signal receiving unit 210 receives a signal detected by the sensor S outside or inside the main body 200. The sensor signal receiving unit 210 may receive the detected signal by a wire/wireless communication scheme, and preferably, may receive the detected signal by a wire communication scheme. Since the sensor S detecting a movement of a wrist joint region in the input devices according to the first to fourth exemplary embodiments of the present invention may be mounted in the band 100 adjacent to the main body 200, the sensor housing 500 inside the main body, or between the band 100 and the main body 200, the signal detected by the sensor S may be transmitted a wire and/or wireless communication scheme in principle, but it is easy to transmit the signal detected by the sensor S by a wire communication scheme. When the signal is transmitted by a wire communication scheme, the input devices according to the first to fourth exemplary embodiments of the present invention may transceive a measured signal with low noise and decreased cost.

The sensor signal receiving unit 210 may amplify the received signal so as to determine the signal received from the sensor S. Further, the sensor signal receiving unit 210 may convert the amplified analog signal to a digital signal.

The movement determining unit 220 determines a movement of a wrist by using the detected signal. Hereinafter, a method of determining, by the movement determining unit 220, a movement of a wrist will be described in detail with reference to FIGS. 37 to 42.

In the input device of FIG. 37, the sensors S (SS1, SS4, SS2, and SS3) are mounted at an upper side, a lower side, a left side, and a right side of the band 100, respectively, and detect a shape change and a movement of a wrist joint region caused by an up and down movement of a hand based on a forearm. In this case, the four sensors S may be provided so as to measure only a change in a one-directional distance between the fixed units 101 inside the band 100 at the positions thereof. Each sensor S may be provided so that a measurement signal of the sensor S is increased when a distance between the fixed units 101 is increased in a direction from a wrist to a finger.

Accordingly, when a user bends the wrist in a lower direction, each of the sensors may detect four sensors as illustrated in FIG. 38. A distance between the fixed units 101 of the sensor SS1 at the upper side of the wrist may be considerably increased, and a distance between the fixed units 101 of the sensor SS4 at the lower side of the wrist may be considerably decreased. Further, distances between the fixed units 101 of the sensors SS2 and SS3 at the left and right sides of the wrist may be slightly decreased or increased. Accordingly, as illustrated in FIG. 38, the four sensors S may detect signals of which sizes are changed according to a time change. The movement determining unit 220 may determine a direction in which the wrist is bent and a size of the bending of the wrist by using time changes of the measured signals, a time change in a ratio between the signals, and the like.

Further, when the sensors S in which each sensor is provided to generate a plurality of signals are used, the movement determining unit 220 may select a signal of which a change value of a size is largest according to a time change among the plurality of signals as a signal of a corresponding sensor or individually compare the plurality of signals or obtain an average value of the plurality of signals and select a result of the comparison or the obtained average value as a signal of a corresponding sensor.

The movement determining unit 220 may compare the signal of FIG. 38 with a signal table (not illustrated) pre-stored in the first memory 260 and determine a movement of the wrist of the user. Size information about a signal of the sensor S according to a time change and data for a movement of a wrist corresponding to the size information may be included in the signal table, and the movement determining unit 220 may compare the signal of FIG. 38 detected at a predetermined time point with size information about a signal according to a time change of the signal table, extract corresponding movement data of the wrist, and determine the movement of the wrist of the user. Herein, data for a movement of a wrist includes information about the kind of movement of a wrist. For example, data for a movement of a wrist may be information about the kind of movement of a wrist, for example, an operation of bending a wrist in a lower direction and an operation of turning a wrist in a clockwise direction.

Further, when the user bends the wrist in the upper direction, the sensors may detect signals illustrated in FIG. 39. When the user bends the wrist in the upper direction, a distance between the fixed units 101 of the sensor SS1 at the upper side of the wrist may be considerably decreased, and a distance between the fixed units 101 of the sensor SS4 at the lower side of the wrist may be considerably increased.

Further, when the user bends the wrist in the upper direction, distances between the fixed units 101 of the sensors SS2 and SS3 at the left and right sides of the wrist may be slightly decreased or increased. Accordingly, the four sensors S may detect signals of which sizes are changed according to a time change as illustrated in FIG. 39. The movement determining unit 220 may compare the signal of FIG. 39 with the size information of the signal according to a time change of the signal table pre-stored in the first memory 260, and extract a corresponding movement of the wrist.

Similarly, the input device according to the exemplary embodiment of the present invention may be mounted with sensors SS1, SS4, SS2, and SS3 at an upper side, a lower side, a left side, and a right side of the band 100, respectively, and detect left and right movements of the wrist as illustrated in FIG. 40.

When a user bends and moves a wrist in the left and right directions as illustrated in FIG. 40, the sensors may detect signals as illustrated in FIGS. 41 and 42. When the user moves the wrist in the left direction, a distance between the fixed units 101 of the sensor SS1 at the upper side of the wrist may be constantly maintained, and a distance between the fixed units 101 of the sensor SS4 at the lower side of the wrist may also be constantly maintained. A distance between the fixed units 101 of the sensor SS2 at the left side of the wrist may be considerably decreased, and a distance between the fixed units 101 of the sensor SS3 at the right side of the wrist may be considerably increased. Accordingly, each of the sensors S may detect a signal of which a size is changed according to a time change as illustrated in FIG. 41. The movement determining unit 220 may compare the signal of FIG. 41 with the size information of the signal according to a time change of the signal table pre-stored in the first memory 260, and extract information about the corresponding movement of the wrist.

When the user moves the wrist in the right direction, each sensor may detect a signal illustrated in FIG. 42. When the user moves the wrist in the right direction, a distance between the fixed units 101 of the sensor SS1 at the upper side of the wrist may be constantly maintained, and a distance between the fixed units 101 of the sensor SS4 at the lower side of the wrist may also be constantly maintained. When the user moves the wrist in the right direction, a distance between the fixed units 101 of the sensor SS2 at the left side of the wrist may be considerably increased, and a distance between the fixed units 101 of the sensor SS3 at the right side of the wrist may be considerably decreased. Accordingly, each of the sensors S may detect a signal of which a size is changed according to a time change as illustrated in FIG. 41. The movement determining unit 220 may compare the signal of FIG. 42 with the size information of the signal according to a time change of the signal table pre-stored in the first memory 260, and extract corresponding movement data of the wrist.

In the case where the size information of the signal according to a time change of the signal table that is pre-stored in the first memory 260 is compared with the signal detected by the sensor signal receiving unit 210, even when the detected signal has a slight difference from the size information of the signal according to a time change stored in the first memory 260, but the difference is equal to or smaller than a predetermined value, the movement determining unit 220 may determine the detected signals as the same signal and extract a corresponding movement of the wrist. Particularly, since a signal detected according to a movement of a wrist of a user may be slightly different from the size information of the signal according to a time change stored in the first memory 260 for each user or despite the same user, when the difference is equal to or smaller than a predetermined value, the movement determining unit 220 may determine the detected signals as the same signal and extract a corresponding movement of the wrist. Accordingly, even when a movement of a wrist of a user is slightly changed, the movement determining unit 220 may determine the corresponding movement of the wrist.

The UI setting unit 230 illustrated in FIG. 36 sets a UI corresponding to a movement of a wrist. The user wearing the input device according to the exemplary embodiment of the present invention may define a UI corresponding to a specific movement of a wrist by using the UI setting unit 230. For example, the user may define a UI so that music is reproduced in the input device when a user continuously bends a wrist two times in the lower direction. Further, when a user moves a wrist in the left direction as illustrated in FIG. 43, the user may define a UI in which an external device connected with the input device according to the exemplary embodiment of the present invention by means of wireless communication displays a text message screen image.

A UI set by a user by using the UI setting unit 230 and data for a specific movement of a wrist corresponding to the UI may be stored in the second memory 270. For example, when a UI is defined as illustrated in FIG. 43, the UI setting unit 230 may match a text message screen image display UI and a movement of a wrist in the left direction and store the UI in the second memory 270, and simultaneously, a message desired by the user may also be displayed in an external device that is connected with the input device according to the exemplary embodiment of the present invention by means of wireless communication. Further, simultaneously, the UI setting unit 230 may match a UI and the movement of the wrist in the left direction so that specific information, for example, text "Hello?" is transmitted to a device of another user and store the UI in the second memory 270. That is, the UI may also be stored in the second memory 270 so that the plurality of UI functions is simultaneously or sequentially performed with one movement of a wrist.

The UI executing unit 240 executes a corresponding UI based on the movement of the wrist determined by the movement determining unit 220. The UI executing unit 240 may extract a UI corresponding to the determined movement of the wrist from the data stored in the second memory 270 and execute the extracted UI.

Further, the UI executing unit 240 may display information displayed on a display of an external device, and may execute functions, such as a micro-processor calculation function, execution of various application programs, and a control function of all hardware of an input device, based on the executed UI.

The communication unit 250 performs communication between the input device according to the exemplary embodiment of the present invention and an external device. The communication unit 250 may transmit the signals detected, determined, and generated by the input device according to the exemplary embodiment of the present invention and the like to an external device, and receive a signal from an external device. When the UI executing unit 240 executes a UI function of operating an external device, the communication unit 250 may transceive a related signal required for executing the UI function between the input device according to the exemplary embodiment of the present invention and the external device.

The first memory 260 may store size change information about a signal of the sensor S according to a time change or ratio change information about each signal and wrist movement data corresponding to the size change information or the ratio change information in the form of a signal table, and the second memory 270 may store a UI corresponding to a specific movement of a wrist.

A user may execute a command corresponding to a specific movement of a wrist by using the first exemplary embodiment related to the main body 200 of the present invention. Further, a user may move a cursor of an external device that is wirelessly connected with the input device according to the exemplary embodiment of the present invention and set a password by a specific movement of a wrist. For example, when a user turns a wrist in a specific direction, a lockscreen of an external device may be locked, and when a user turns a wrist in an opposite direction, the lockscreen of the external device may be released.

A user may execute various UIs with a simple movement of a wrist by using the first exemplary embodiment related to the main body 200 of the present invention. Accordingly, a user may easily operate the input device, and every user may set and execute a UI with a desired movement of a wrist, so that a user may more conveniently use the input device with considerably enhanced security.

Hereinafter, a second exemplary embodiment of a main body 200 of the present invention will be described with reference to FIGS. 44 to 47. Overlapping contents to those of the first exemplary embodiment related to the main body 200 of the present invention will be omitted, and a difference from the first exemplary embodiment related to the main body 200 will be described.

Figure 44:
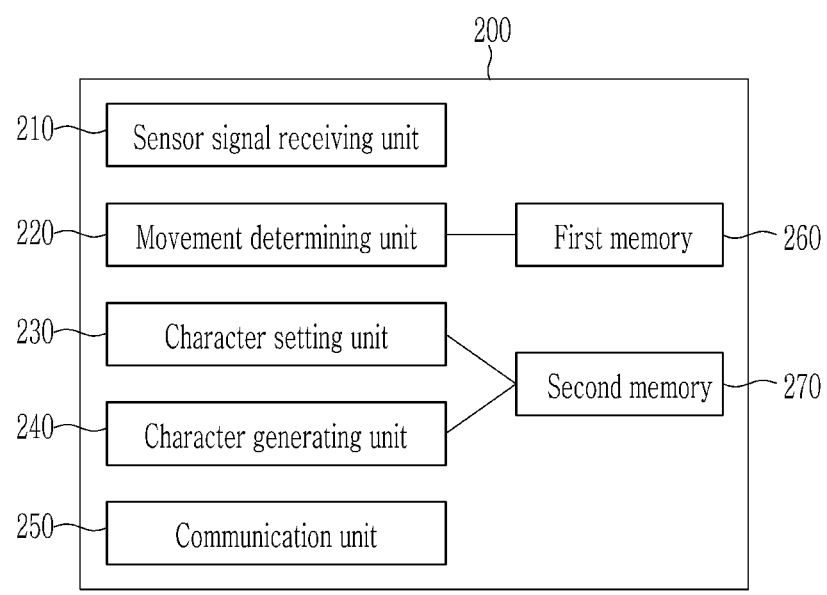
FIG. 44 is a block diagram illustrating a second exemplary embodiment of a main body of the present invention.
Figure 45:
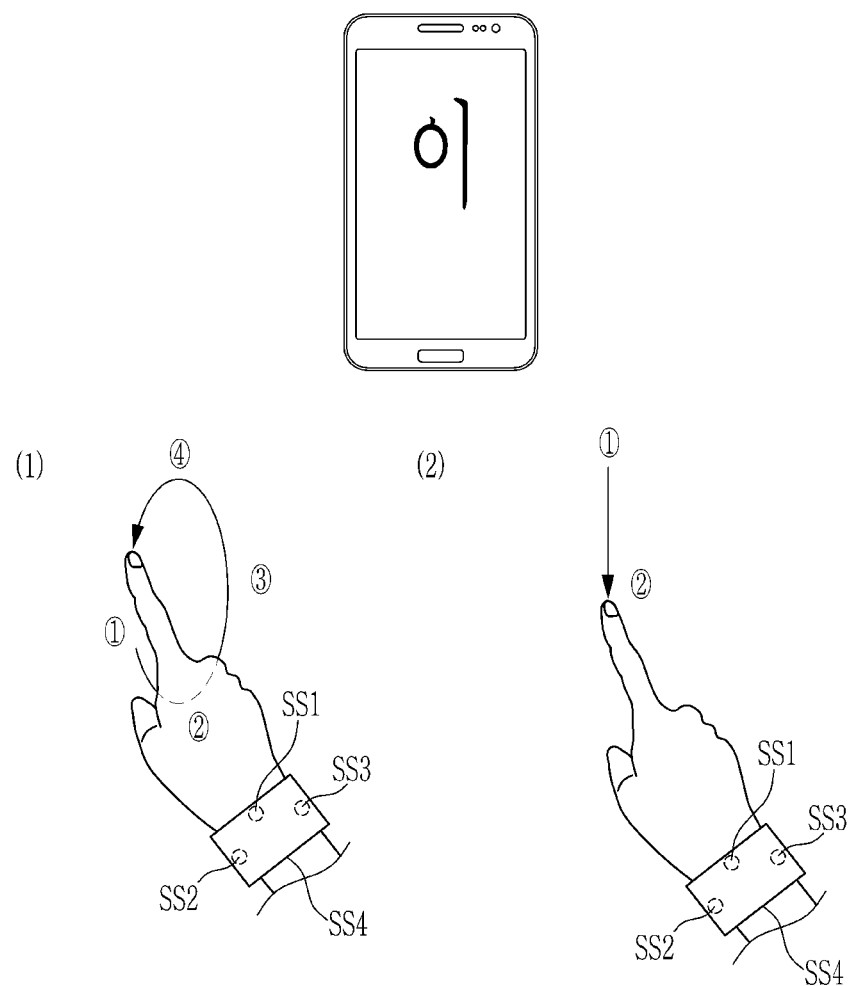
FIG. 45 is a diagram illustrating an example in which a character is input according to a movement of a wrist in the second exemplary embodiment related to the main body of the present invention.

FIG. 44 is a block diagram illustrating a second exemplary embodiment of a main body of the present invention, and FIG. 45 is a diagram illustrating an example in which a character is input according to a movement of a wrist in the second exemplary embodiment related to the main body of the present invention. FIGS. 46 and 47 are graphs illustrating signals obtained by detecting a movement of a wrist of FIG. 45.

The second exemplary embodiment related to the main body 200 of the present invention may be included in the input devices according to the first to fourth exemplary embodiments of the present invention, and thus, it is possible to operate the input devices according to the first to fourth exemplary embodiments of the present invention by using the second exemplary embodiment related to the main body 200 of the present invention.

As illustrated in FIG. 44, the second exemplary embodiment related to the main body 200 of the present invention includes a sensor signal receiving unit 210, a movement determining unit 220, a character setting unit 280, a character generating unit 290, a communication unit 250, a first memory 260, and a second memory 270.

The sensor signal receiving unit 210, the movement determining unit 220, the communication unit 250, and the first memory 260 of the second exemplary embodiment related to the main body 200 of the present invention may perform the same functions as those of the first exemplary embodiment related to the main body 200 of the present invention, so that overlapping descriptions thereof will be omitted.

The character setting unit 280 sets a character corresponding to a movement of a wrist. A user wearing the input device including the second exemplary embodiment related to the main body 200 of the present invention may define a character corresponding to a specific movement of a wrist by using the character setting unit 280.

For example, when a user makes a gesture of writing a character "이", the character "이" may be defined to be generated in the input device as illustrated in FIG. 28. Further, the character "이" generated in the input device may be displayed on an external device wirelessly connected with the input device. In this case, the sensor signal receiving unit 210 may receive signals illustrated in FIGS. 46 and 47 while the user writes the character "이", and the movement determining unit 220 may compare size information of the signals of FIGS. 46 and 47 with size information of a signal according to a time change of a signal table pre-stored in the first memory 260, extract a user's movement of turning a wrist in a counterclockwise direction or bending a wrist in the lower direction, and determine a movement of the wrist. The character setting unit 280 may match the movement of turning the wrist in the counterclockwise direction and bending the wrist in the lower direction to the character "이", and the movement of turning the wrist in the counterclockwise direction and bending the wrist in the lower direction and the character "이" corresponding to the movement may be stored in the second memory 270.

In the foregoing example, the case where the character "이" is generated for the movement of turning the wrist in the counterclockwise direction and bending the wrist in the lower direction has been described, but the character "이" may be defined to be generated for a habit of a user or another movement of a wrist for convenience. Further, a user may define a character "ㅇ" to be generated for a movement of turning a wrist in the counterclockwise direction and define a character "ㅣ" to be generated for a movement of bending a wrist in the lower direction.

The character generating unit 290 generates a corresponding character based on the movement of the wrist determined by the movement determining unit 220. The character generating unit 290 may extract a character corresponding to the determined movement of the wrist from the data stored in the second memory 270 and generate the character. For example, when a user makes a gesture of writing a character "이" as illustrated in FIG. 45, the character generating unit 290 extracts the character "이" corresponding to a movement of turning a wrist in the counterclockwise direction and bending the wrist in the lower direction from the data stored in the second memory 270 and generates the character "이", and enable the character "이" to be displayed on an external device that communicates with the input device. Herein, the data for the characters stored in the second memory 270 may include specific characters, for example, "가", "나", and "ㅣ", corresponding to the movements of a wrist.

The character generated by the character generating unit 290 may also be immediately displayed on a display of an external device, but may not be immediately displayed on an external device and may be temporarily stored in a memory (not illustrated), such as a buffer, depending on a situation.

A specific movement of a wrist and character data corresponding to the specific movement of the wrist are stored in the second memory 270.

A user may easily generate and input a character by using the second exemplary embodiment related to the main body 200 of the present invention. Since it is possible to set a character corresponding to a movement of a wrist of a user based on a user, the second exemplary embodiment related to the main body 200 may generate a corresponding character even when a gesture of writing the character is different for each user. Further, the input device according to the exemplary embodiment of the present invention may obtain sensor signals by a scheme in which a user grips, holds, and moves or presses and rubs the main body 200.

In this case, the first exemplary embodiment and the second exemplary embodiment related to the main body 200 of the present invention may be independently and separately operated during the operation, but the operation of the two exemplary embodiments may be simultaneously connected with each other, thereby operating more complex UI functions.

Hereinafter, a method of setting and executing a UI according to the first exemplary embodiment related to the main body 200 of the present invention will be described in more detail with reference to FIGS. 48 and 49. Overlapping contents of a method of setting and executing a UI of FIGS. 30 and 31 according to the first exemplary embodiment related to the main body 200 of the present invention to the foregoing contents may be omitted.

Figure 48:
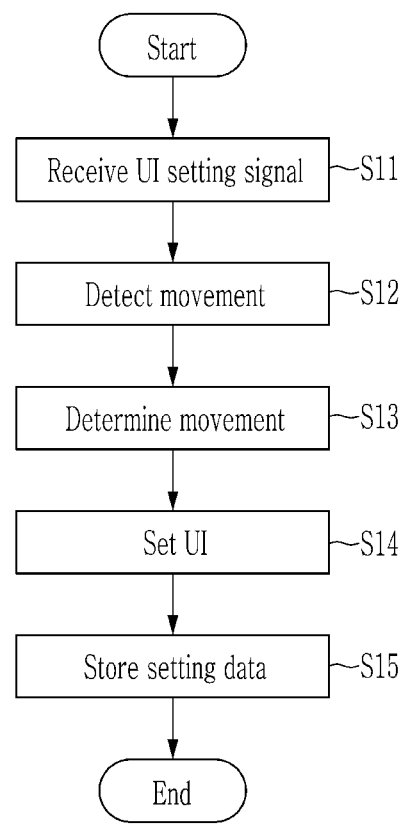
FIG. 48 is a flowchart illustrating a method of setting a UI according to the first exemplary embodiment related to the main body in the input device according to the exemplary embodiment of the present invention.

FIG. 48 is a flowchart illustrating a method of setting a UI according to the first exemplary embodiment related to the main body in the input device according to the exemplary embodiment of the present invention. FIG. 49 is a flowchart illustrating a method of executing a UI according to the first exemplary embodiment related to the main body in the input device according to the exemplary embodiment of the present invention.

In FIG. 48, in order to set a UI according to the first exemplary embodiment related to the main body 200 of the present invention, first, the input device of the present invention receives a signal for setting a UI corresponding to a movement of a wrist joint region from a user (S11). The input device detects a movement of a wrist joint region based on a degree of a change according to a contraction or an extension of the band 100, a change in a distance of a gap between the sensor housing 500 and the fixed unit 101 inside the main body, a change in a distance of a gap between the band 100 and the main body 200, and the like (S12). The band 100 may include the fixed units 101 and the connection units 102 which connect the fixed units 101 and are contracted or extended, and the sensor S may detect a movement of a wrist based on a change in a distance between the fixed units 101 (S12). Further, the band 100 may include the transformation units 103 and the connection units 102 connecting the transformation units 103, and the sensor S may detect a movement of a wrist based on changes in shapes of the constituent elements of the transformation units 103 (S12). The input device determines a movement of a wrist by using the signal detected by the sensor S and data of the first memory 260 (S13), and sets a UI corresponding to the determined movement of the wrist (S14). The input device stores the determined movement of the wrist and data for the UI corresponding to the determined movement of the wrist in the second memory 270 (S15).

Figure 49:
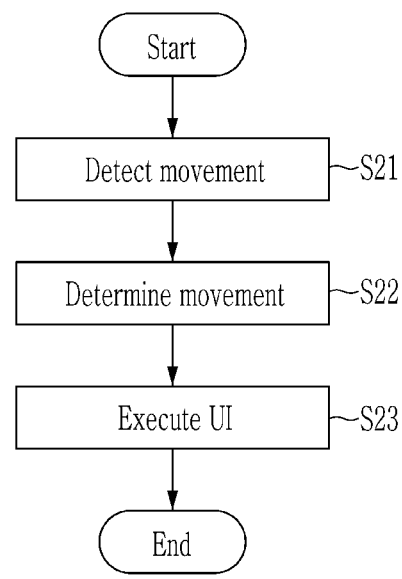
FIG. 49 is a flowchart illustrating a method of executing a UI according to the first exemplary embodiment related to the main body in the input device according to the exemplary embodiment of the present invention.

In FIG. 49, in order to execute a UI defined by a user, the input device detects a movement of a wrist based on a degree of a change according to a contraction or an extension of the band 100, a change in a distance of a gap between the sensor housing 500 and the fixed unit 101 inside the main body, a change in a distance of a gap between the band 100 and the main body 200, and the like (S21). Further, the input device determines the movement of the wrist by using the detected signal (S22). The input device extracts a UI corresponding to the determined movement of the wrist from the second memory 270 and executes the extracted UI (S23).

Hereinafter, a method of setting and executing a UI according to the second exemplary embodiment related to the main body 200 of the present invention will be described in more detail with reference to FIGS. 50 and 51. The method of setting and executing a UI according to the second exemplary embodiment related to the main body 200 of the present invention is a method of setting and generating a UI for inputting a character, and is the same as the method of setting and generating a character of the main body 200 according to the second exemplary embodiment of the present invention. Accordingly, overlapping contents to the already-described contents in the second exemplary embodiment related to the main body 200 of the present invention may be omitted.

Figure 50:
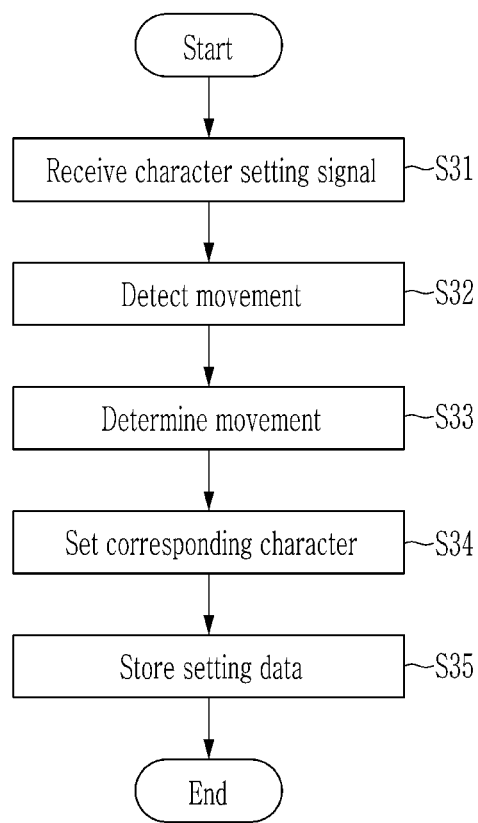
FIG. 50 is a flowchart illustrating a method of setting a UI according to the second exemplary embodiment related to the main body of the present invention.
Figure 51:
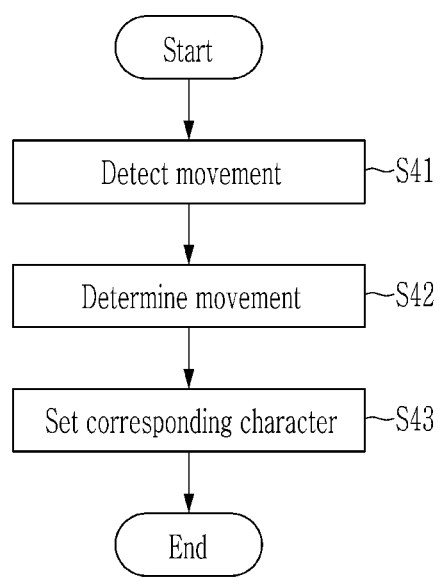
FIG. 51 is a flowchart illustrating a method of executing the UI according to the second exemplary embodiment related to the main body of the present invention.

FIG. 50 is a flowchart illustrating a method of setting a UI according to the second exemplary embodiment related to the main body 200 of the present invention. FIG. 51 is a flowchart illustrating a method of executing the UI according to the second exemplary embodiment related to the main body 200 of the present invention.

In FIG. 50, in the method of setting a UI according to the second exemplary embodiment related to the main body 200 of the present invention, first, the input device receives a signal for setting a character corresponding to a movement of a wrist from a user (S31). In the input device, the sensor S detects a movement of a wrist based on a degree of a change according to a contraction or an extension of the band 100, a change in a distance of a gap between the sensor housing 500 and the fixed unit 101 inside the main body, a change in a distance of a gap between the band 100 and the main body 200, and the like (S32). The band 100 may include the fixed units 101 and the connection units 102 which connect the fixed units 101 and are contracted or extended, and the sensor S may detect a movement of a wrist based on a change in a distance between the fixed units 101 (S32). Further, the band 100 may include the transformation units 103 and the connection units 102 connecting the transformation units 103, and the sensor S may detect a movement of a wrist based on changes in shapes of the constituent elements of the transformation units 103 (S32). The input device determines the movement of the wrist by using the sensor signal detected by the sensor and the signal table stored in the first memory 260 (S33), and sets a character corresponding to the determined movement of the wrist (S34). The input device stores the determined movement of the wrist and data for the character corresponding to the determined movement of the wrist in the second memory 270 (S35).

In the method for executing a UI according to the second exemplary embodiment related to the main body 200 of the present invention, in the input device, the sensor S detects a movement of a wrist based on a degree of a change according to a contraction or an extension of the band 100, a change in a distance of a gap between the sensor housing 500 and the fixed unit 101 inside the main body, a change in a distance of a gap between the band 100 and the main body 200, and the like (S41). Further, the input device determines the movement of the wrist by using the detected signal from the sensor (S42). The input device extracts a character corresponding to the determined movement of the wrist from the second memory 270 and generates the character (S43).

In the foregoing, the input device according to the exemplary embodiment of the present invention has been mainly described based on the example in which the input device is worn on a part of a body, for example, a wrist joint region, of a user and is operated by the cause operation including a shape change or a movement of a wrist joint region or a movement of an arm, but the present invention is not limited thereto, and the input device may be worn on all of the joint regions of a user and be operated by an operation of bending a corresponding joint, and when the input device is worn on any one part of the body of the user, the input device may also be operated by a cause operation including a shape change or a movement of a wearing portion.

Further, the input device according to the exemplary embodiment of the present invention may be operated by gripping and holding a part, for example, the band 100 and the main body 200, of the input device, and applying external force or rubbing the input device.

Accordingly, for example, when a user is a person, the input device according to the exemplary embodiment of the present invention may be used by a cause operation of a user, for example, an operation of changing a shape of a body joint by bending the body joint on which the input device is worn, an operation of moving a body joint on which the input device is worn in a space, an operation of applying external force to a part of the input device worn on a body joint, and an operation of rubbing a part of the input device worn on a body joint.

When the input device according to the exemplary embodiment of the present invention is operated by a shape change or a movement of a wearing portion, it is not necessary to separately manipulate the input device by using another body region of a user and a user may operate the input device only by a change and a movement of a body region itself on which the input device is worn.

Further, when the input device is operated by applying external force to or rubbing the input device according to the exemplary embodiment of the present invention by using other body region of a user or a body region of another user, other than a body region on which the input device is worn, the user may operate the input device by another body region of the same user who does not wear the input device or a body region of another user who does not wear the input device.

Accordingly, since the input device according to the exemplary embodiment of the present invention may be operated by various methods, a user may operate the input device according to the exemplary embodiment of the present invention by a different method depending on a situation.

The input device according to the exemplary embodiment of the present invention described above may be worn on a body of a user by the method in which the band 100 having a patch shape of which both ends are separated is worn on a body of a user via the wearing part 300, and the method in which the band 100 having a ring shape of which both ends are connected is slipped or wound on a body of a user.

The input device according to the exemplary embodiment of the present invention including the band 100 shaped like a patch may be directly attached and worn on a body region of a user on which it is difficult to put or wind the input device according to the exemplary embodiment of the present invention. For example, the input device may be attached to a region, such as a neck and a shoulder, of a body of a user, thereby detecting a movement of a wearing portion, such as a neck and a shoulder, of a user. Further, for example, the input device may be mounted as a part of clothes, such as a corset, stocking, and lingerie, or wearing accessories, such as shoes and gloves, and connected to and worn on a body of a user, thereby detecting a movement of a wearing portion.

Figure 52:
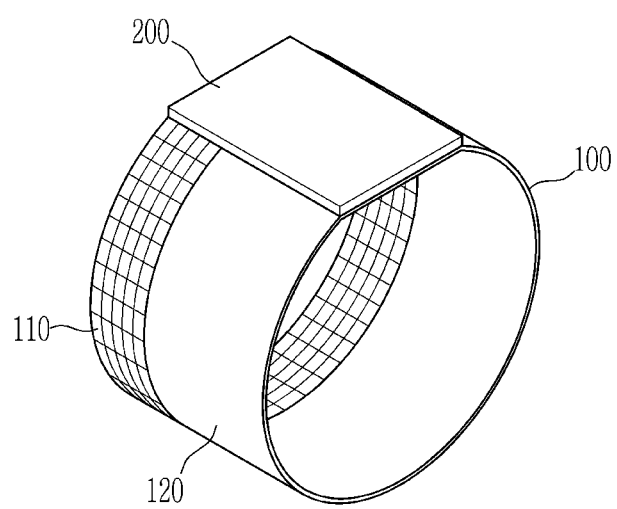
FIG. 52 is a diagram illustrating the case where the band of the input device according to the exemplary embodiment of the present invention has a ring shape.

FIG. 52 is a diagram illustrating the state where the band of the input device according to the exemplary embodiment of the present invention has a ring shape.

The input device having the ring shape among the input devices according to the exemplary embodiments of the present invention includes a band 100 shaped like a ring and a main body 200. The band 100 may include a flexible area 110 and may also include a fixed area 120. The input device having the ring shape according to the exemplary embodiment of the present invention may detect a cause operation, such as a shape change or a movement of a wearing portion of a user, or external force or rubbing, by the same sensing method as that of the input devices according to the first to fourth exemplary embodiments of the present invention. Further, in the input device having the ring shape according to the exemplary embodiment of the present invention, the band 100 may be worn on a partial region of a user without a wearing part 300.

Further, when the input device according to the exemplary embodiment of the present invention described above is used, it is possible to set and execute a UI of the input device itself according to the exemplary embodiment of the present invention, and a smart phone and a computer device, such as a personal computer (PC), communicating with the input device according to the exemplary embodiment of the present invention may be controlled via the input device according to the exemplary embodiment of the present invention. Further, it is possible to make a control, an input, and a UI control for a virtual reality device by using a shape change or a movement of a region on which the input device according to the exemplary embodiment of the present invention is worn.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

According to the input device and the method of setting and executing a UI of the input device according to the exemplary embodiment may be used for input devices of mobile devices including a wearable device and a smart phone, computers, or various electronic devices.

The invention claimed is:

1. An input device, comprising:
a band having a contracted or extended flexible area;
a sensor which detects a change of the flexible area and outputs a signal corresponding to the detected change of the flexible area; and
a main body which is connected to the band, and determines a cause operation for the change of the flexible area based on the signal output from the sensor,
wherein the flexible area includes fixed units, and connection units which connect the fixed units and are contracted or extended, and a distance between the fixed units is changed according to the cause operation,
wherein the sensor detects the cause operation based on a change in a distance between the fixed units,
wherein the main body further includes
a first memory which stores a signal table including size information about a signal according to a time change and data for the cause operation corresponding to the size information about the signal, and
a movement determining unit which compares the detected signal and the size information about the signal according to the time change of the signal table and determines the corresponding cause operation.

2. The input device of claim 1, wherein:
a shape of the connection unit is changed according to the cause operation.

3. An input device, comprising:
a band having a contracted or extended flexible area;
a sensor which detects a change of the flexible area and outputs a signal corresponding to the detected change of the flexible area; and
a main body which is connected to the band, and determines a cause operation for the change of the flexible area based on the signal output from the sensor,
wherein the flexible area includes transformation units, and connection units which connect the transformation units, and a shape of the transformation unit is changed according to the cause operation,
wherein the transformation unit includes a first constituent element and a second constituent element, and the sensor detects the cause operation based on a change in a distance between the first constituent element and the second constituent element according to shape changes of the first constituent element and the second constituent element;
wherein the main body further includes
a first memory which stores a signal table including size information about a signal according to a time change and data for the cause operation corresponding to the size information about the signal, and
a movement determining unit which compares the detected signal and the size information about the signal according to the time change of the signal table and determines the corresponding cause operation.

4. An input device, comprising:
a band having a contracted or extended flexible area;
a sensor which detects a change of a flexible area and outputs a signal corresponding to the detected change of the flexible area; and
a main body which is connected to the band and determines a cause operation for the change of the flexible area based on the signal output from the sensor,
wherein the flexible area includes fixed units, and transformation units which connect the fixed units, and a distance between the fixed units or a shape of the transformation unit is changed according to the cause operation
wherein the sensor detects the cause operation based on a change in a distance between the fixed units,
wherein the main body further includes
a first memory which stores a signal table including size information about a signal according to a time change and data for the cause operation corresponding to the size information about the signal, and
a movement determining unit which compares the detected signal and the size information about the signal according to the time change of the signal table and determines the corresponding cause operation.

5. The input device of claim 3, wherein:
the sensor detects the cause operation based on a change in a length of the transformation unit according to a shape change of the transformation unit.

6. An input device, comprising:
a main body;
a sensor housing provided in the main body; and
a sensor which detects a change in a distance between the sensor housing and a fixed unit positioned inside the sensor housing, and outputs a signal corresponding to the detected change in the distance between the sensor housing and the fixed unit,
wherein the main body determines a cause operation for the change in the distance between the sensor housing and the fixed unit based on the signal output from the sensor,
wherein the main body further includes
a first memory which stores a signal table including size information about a signal according to a time change and data for the cause operation corresponding to the size information about the signal, and
a movement determining unit which compares the detected signal and the size information about the signal according to the time change of the signal table and determines the corresponding cause operation.

7. The input device of claim 6, further comprising:
a band which is connected to the main body and is worn on a partial region of a user.

8. The input device of claim 6, wherein:
the main body includes a connection unit which connects the sensor housing and the fixed unit and is contracted or extended.

9. The input device of claim 6, wherein:
the main body further includes a transformation unit which connects the sensor housing and the fixed unit, and a shape of the transformation unit is changed according to the cause operation.

10. An input device, comprising:
a band;
a main body connected to the band; and
a sensor which detects a change in a distance of a gap formed between the band and the main body, and outputs a signal corresponding to the detected change in the distance of the gap,
wherein the main body determines a cause operation for the change in the distance of the gap based on the signal output from the sensor,
wherein the main body further includes
a first memory which stores a signal table including size information about a signal according to a time change and data for the cause operation corresponding to the size information about the signal, and
a movement determining unit which compares the detected signal and the size information about the signal according to the time change of the signal table and determines the corresponding cause operation.

11. The input device of claim 10, further comprising:
a transformation unit which connects the band and the main body, wherein a shape of the transformation unit is changed according to the cause operation.

12. The input device of claim 1, wherein:
the main body further includes:
a UI setting unit which sets a UI corresponding to the cause operation;
a second memory which stores the UI set by the UI setting unit and data for the cause operation corresponding to the UI; and
a UI executing unit which executes a UI corresponding to the cause operation.

13. The input device of claim 1, wherein:
the main body further includes:
a character setting unit which sets a character corresponding to the cause operation;
a second memory which stores the character set by the character setting unit and data for the cause operation corresponding to the character; and
a character generating unit which generates a character corresponding to the cause operation.

14. The input device of claim 3, wherein:
the main body further includes:
a UI setting unit which sets a UI corresponding to the cause operation;
a second memory which stores the UI set by the UI setting unit and data for the cause operation corresponding to the UI; and
a UI executing unit which executes a UI corresponding to the cause operation.

15. The input device of claim 3, wherein:
the main body further includes:
a character setting unit which sets a character corresponding to the cause operation;
a second memory which stores the character set by the character setting unit and data for the cause operation corresponding to the character; and
a character generating unit which generates a character corresponding to the cause operation.

16. The input device of claim 6, wherein:
the main body further includes:
a UI setting unit which sets a UI corresponding to the cause operation; a second memory which stores the UI set by the UI setting unit and data for the cause operation corresponding to the UI; and
a UI executing unit which executes a UI corresponding to the cause operation.

17. The input device of claim 6, wherein:
the main body further includes:
a character setting unit which sets a character corresponding to the cause operation;
a second memory which stores the character set by the character setting unit and data for the cause operation corresponding to the character; and
a character generating unit which generates a character corresponding to the cause operation.

18. A method of executing a UI of an input device, the method comprising:
by an input device including a main body,
detecting a cause operation for a change in a distance between components configuring the input device;
determining the cause operation by using the detected signal; and
extracting and executing a UI corresponding to the cause operation,
wherein the main body includes a memory which stores a signal table including size information about a signal according to a time change and data for the cause operation corresponding to the size information about the signal,
wherein the determining the cause operation by using the detected signal comprises:
comparing the detected signal and the size information about the signal according to the time change of the signal, and
determining the cause operation corresponding the size information about the signal according to the time change of the signal.

19. A method of executing a UI of an input device, the method comprising:
- by an input device including a main body,
- detecting a cause operation for a change in a distance between components configuring the input device;
- determining the cause operation by using the detected signal; and
- extracting and generating a character corresponding to the cause operation,
- wherein the main body includes a memory which stores a signal table including size information about a signal according to a time change and data for the cause operation corresponding to the size information about the signal,
- wherein the determining the cause operation by using the detected signal comprises:
- comparing the detected signal and the size information about the signal according to the time change of the signal, and
- determining the cause operation corresponding the size information about the signal according to the time change of the signal.

* * * * *